US010735597B1

(12) United States Patent
Zagorski et al.

(10) Patent No.: US 10,735,597 B1
(45) Date of Patent: Aug. 4, 2020

(54) SELECTING USER DEVICE DURING COMMUNICATIONS SESSION

(71) Applicant: Amazon Technologies, Inc., Seattle, WA (US)

(72) Inventors: Jerzy Zagorski, Gdansk (PL); Tomasz Miarowski, Gdynia (PL)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 15/934,116

(22) Filed: Mar. 23, 2018

(51) Int. Cl.
H04M 3/56 (2006.01)
H04M 1/60 (2006.01)
H04L 29/06 (2006.01)
H04N 7/14 (2006.01)
G06T 7/70 (2017.01)

(52) U.S. Cl.
CPC ............... *H04M 3/567* (2013.01); *G06T 7/70* (2017.01); *H04L 65/1006* (2013.01); *H04L 65/1069* (2013.01); *H04L 65/1089* (2013.01); *H04L 65/608* (2013.01); *H04M 1/6033* (2013.01); *H04M 3/568* (2013.01); *H04N 7/147* (2013.01); *H04M 2201/40* (2013.01); *H04M 2250/74* (2013.01)

(58) Field of Classification Search
CPC .... H04M 3/567; H04M 1/6033; H04M 3/568; H04M 2250/74; H04M 2201/40; H04L 65/608; H04L 65/1069; H04L 65/1006; H04L 65/1089; G06T 7/70; H04N 7/147; H04R 5/027
See application file for complete search history.

(56) References Cited

U.S. PATENT DOCUMENTS

| 7,656,889 B2 * | 2/2010 | Jeon ................... H04L 29/06027 370/428 |
| 8,639,214 B1 * | 1/2014 | Fujisaki ................. G06Q 20/32 379/88.03 |
| 9,367,224 B2 * | 6/2016 | Ananthakrishnan ........................ G06F 3/0486 |
| 9,553,973 B2 * | 1/2017 | Clarke ................ H04M 1/6041 |
| 9,692,905 B2 * | 6/2017 | Levien ..................... H04W 4/16 |
| 9,756,166 B2 * | 9/2017 | Cho ..................... H04M 19/048 |
| 2012/0309373 A1 * | 12/2012 | Abogendia ............. H04W 4/16 455/417 |
| 2015/0229749 A1 * | 8/2015 | Cho .................... H04M 1/7253 455/566 |

(Continued)

*Primary Examiner* — Akelaw Teshale
(74) *Attorney, Agent, or Firm* — Lee & Hayes, P.C.

(57) ABSTRACT

This disclosure describes, in part, techniques for establishing network-based data communications (e.g., voice calls, video calls, etc.) between a user device of a user and a remote device of another user, and transitioning the data communications to a different user device of the user based on various types of information. In some examples, the user devices may be located in one or more environments of the user, and the data communications may be transitioned between the user devices based, at least in part, on a location of the user in the environment(s) relative to the multiple devices. For instance, if a user device is performing data communications with the remote device, but it is determined that the user has moved into a closer proximity to another user device, the performance of the data communications may be transitioned to the other user device to which the user is in closer proximity.

20 Claims, 17 Drawing Sheets

(56) References Cited

U.S. PATENT DOCUMENTS

2016/0174038 A1\* 6/2016 Menardais ........... G06Q 20/327
                                                    340/539.11
2016/0286031 A1\* 9/2016 Wang ................ H04M 1/72569
2017/0180957 A1\* 6/2017 Lakkis .............. H04M 3/42059

\* cited by examiner

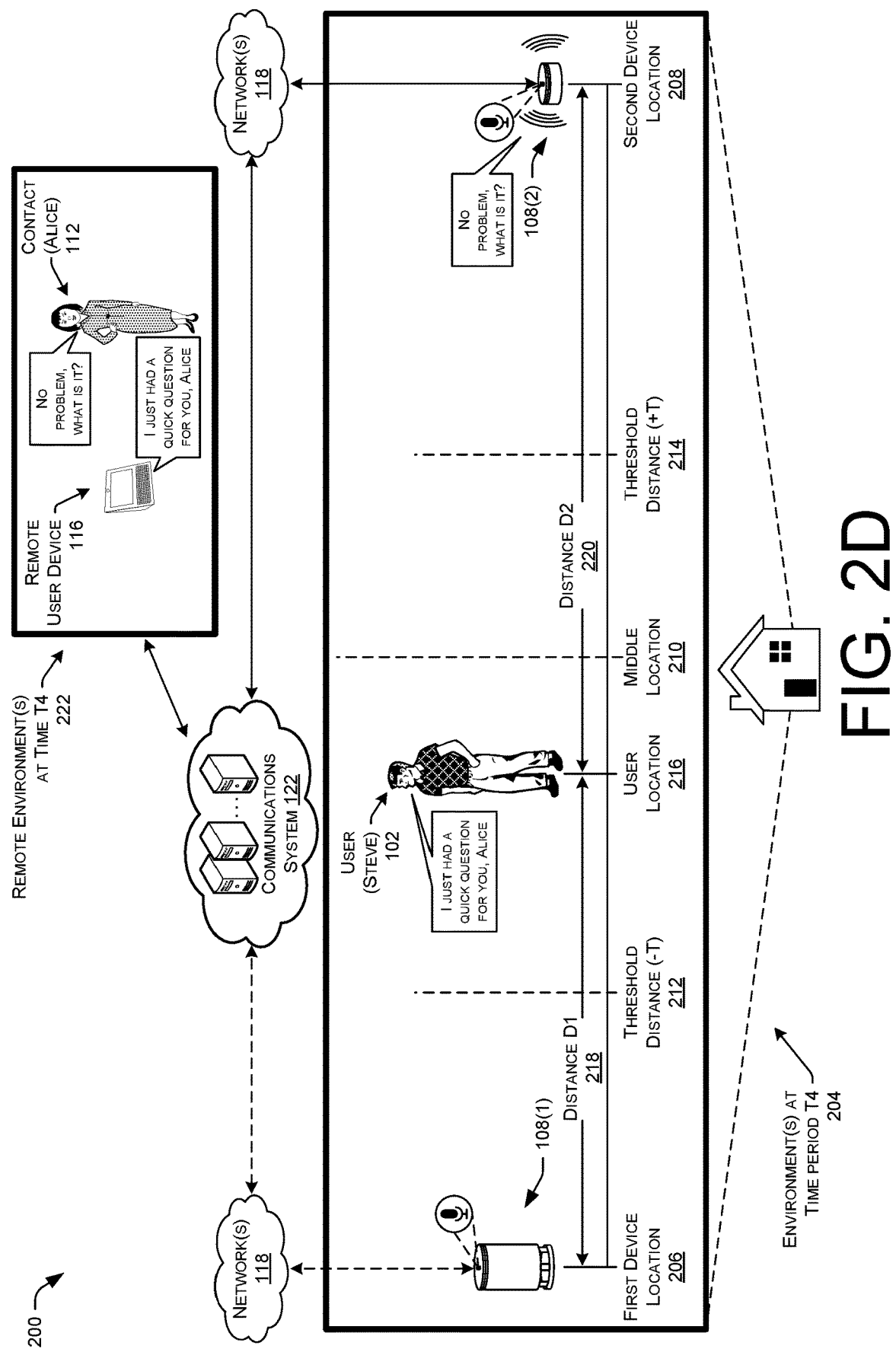

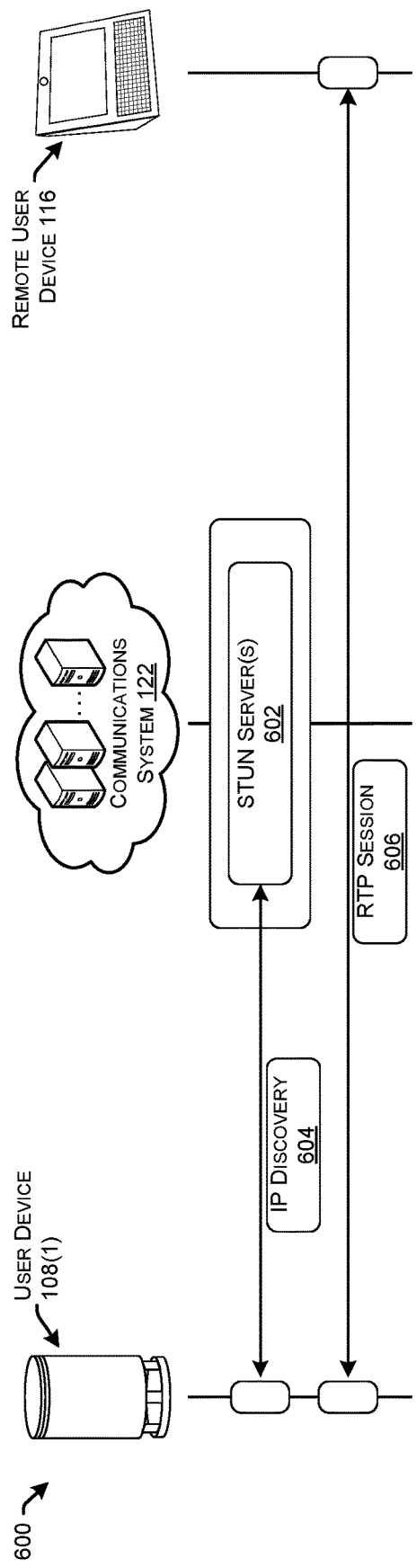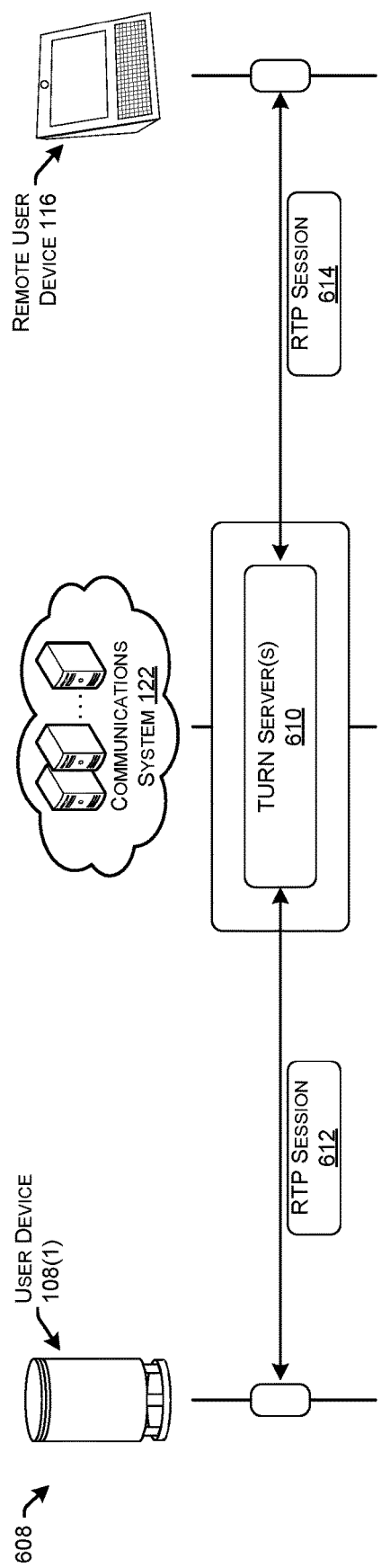

SELECTING USER DEVICE DURING COMMUNICATIONS SESSION

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. Due to their usefulness, it may be the beginning of an emerging trend for users to place multiple voice-enabled devices throughout their homes to receive and respond to their voice commands in different locations in their homes. Having multiple voice-enabled devices placed throughout an environment increases the complexity of determining which voice-enabled device is to respond to a voice command or otherwise interact with a user. Provided herein are specific technical solutions for improving existing systems so they are more useful for users having multiple voice-enabled devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A, 2B, 2C, and 2D illustrate schematic diagrams of illustrative environments through which a user moves while conducting a voice call, and further illustrate a communications system transitioning the flow of data of the voice call between multiple user devices based on a location of the user relative to multiple user devices in the environment.

FIGS. 6A and 6B illustrate example components for a communications system to establish a flow of data between devices.

DETAILED DESCRIPTION

Figure 1:
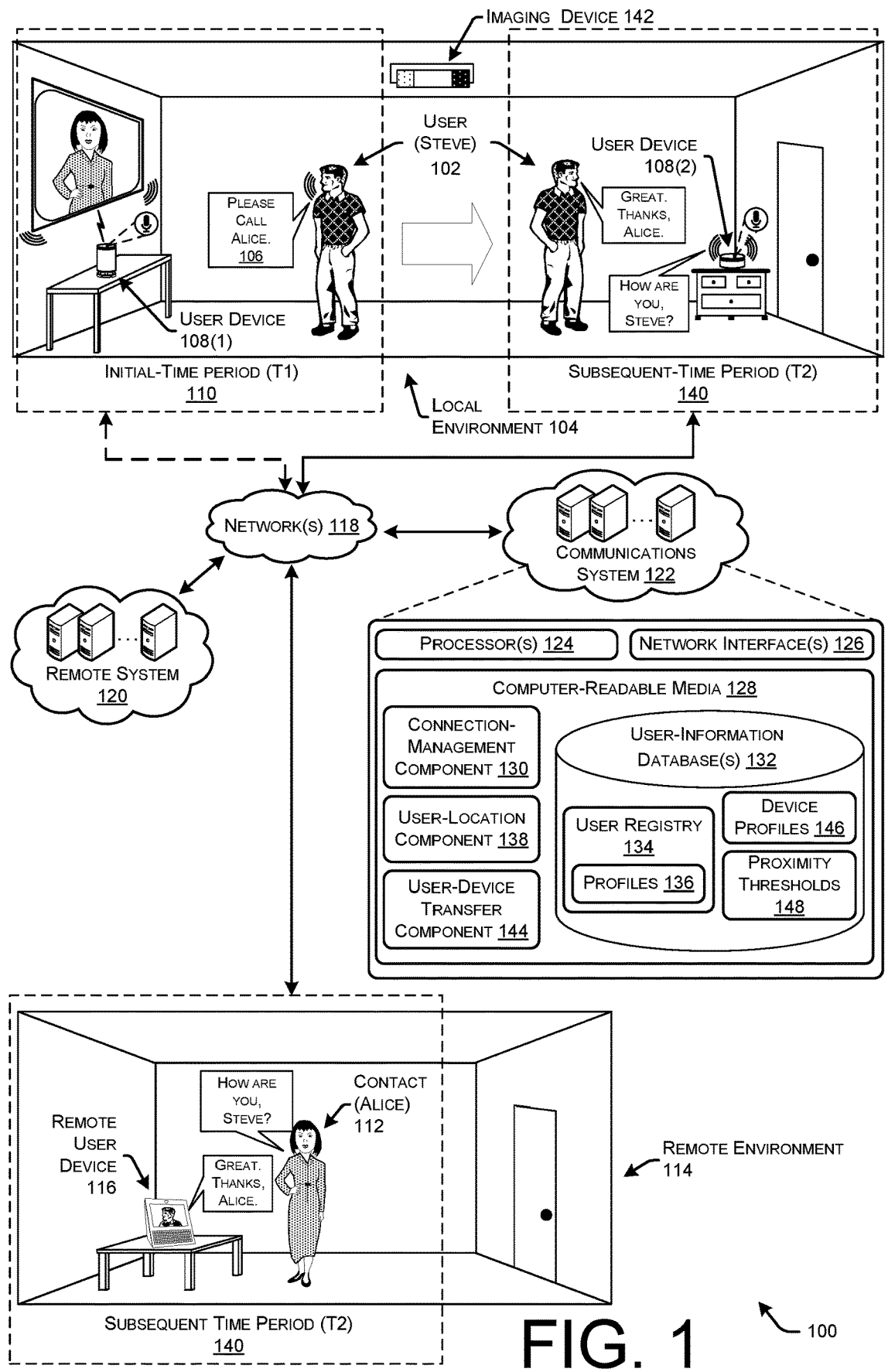
FIG. 1 illustrates a schematic diagram of an illustrative environment in which a user moves through an environment while having a call with a remote device of a contact of the user, and flow of data for the call is transitioned between multiple user devices in the environment of the user based on a position of the user in the environment.

Due to the usefulness of personal computing devices, sometimes referred to herein as "user devices," users may operation or interact with multiple user devices in various environments (e.g., home, office, hotel, or other environments). For example, a user may position user devices (e.g., cell phones, voice-enabled devices, display devices, etc.) in different rooms of a house to allow the user to interact with devices throughout their house without having to carry a user device with them. These user devices are often utilized by users for communicating, such as performing voice calls, video calls, and so forth. A user may begin a call on a user device positioned in one room, but may wish to move to other rooms around their house while conducting the call. In such examples, the user may wish to continue their conversation in different rooms, or different locations in a room, without having to carry the user device with them.

Described herein, at least in part, are technological techniques for a communications system to use various types of information to transition data flows (e.g., voice calls, video calls, etc.) between user devices based, at least in part, on a position of the user in one or more environments in which the multiple user devices are positioned. The various types of information may include information that can be utilized to determine a position of the user in the environment, such as a proximity to, or a distance between, the user and the different user devices. In some examples, a communications system that is at least partly conducting the call may transition a flow, stream, transmission, or other form of sending/receiving call data between a first local user device and a remote device from the first local user device to a second local user device based at least partly on the user being closer to the second local user device. In this way, a user may be able to move throughout one or more environments, such as through a room or multiple rooms in a house, and maintain a conversation or dialogue of the call utilizing different user devices as they move through the environment(s).

In some examples, a communications system, which may include one or more network-based computing devices remote from the user devices, may determine that the user wishes to conduct a call using their user device(s). The communication system may establish a voice call with a contact of the user, such as by a traditional cable telephone line or over a network using a Voice over Internet Protocol (VoIP) (e.g., Real-time Transport Protocol (RTP), Skype Protocol, etc.). In some examples, the user may have provided the communications system with indications (e.g., IP addresses, phone numbers, etc.) of the different devices of the user that may be utilized to perform a call. The communications system may establish and facilitate a call between one of the user devices of the user and a remote device of a contact of the user, and determine, at least periodically, if the user is moving through their house, or other environment, such that the user is more near a different user device. For instance, the communications system may receive audio data from different user devices, and determine whether the user is heard more "loudly" by a different user device than the user device that is currently conducting the call. If the communications system determines that the user has moved in the environment and is more near a different user device than the device conducting the call, the communications system may establish a connection between the user device that the user is more near with the remote device of the contact, and end the call between the device that was previously conducting the call. In this way, a communications system may be configured to transition a flow of data for a call between different user devices to allow a user to move throughout their house, or other environment, while performing The techniques described herein may be utilized with any type of user device (e.g., phones, voice-enabled devices, display devices, etc.). For instance, with the proliferation of sound-controlled computing devices, sometimes referred to herein as "voice-enabled devices," users are able to interact with one or more of their computing devices through speech or other sounds. More devices include microphones, speakers, displays, and other components to interact with a user. Voice-enabled devices may include such components such that a user may utter a command or make other types of sound(s), which are sometimes referred to herein as "voice commands," via speech or other types of sounds to a voice-enabled device. In response, the device by itself and/or with other computing systems (e.g., remote communications systems, remote speech-processing systems, etc.) performs at least one operation, such as turning on/off an appliance, streaming music, performing a telephone call, etc. Due to the usefulness of these voice-enabled devices, users often have multiple devices in an environment, such as their home.

In some examples, a user may utter a voice command, or provide other input, requesting the communications system to establish a voice call, video call, or any other type of communication (collectively referred to as a "call") with a contact of the user. For example, the user may have configured their user devices to perform voice calls or video calls, by themselves and/or with remote computing systems, such that the user devices are able to conduct a call as if the user was using their cellular phone. For instance, the different user devices and/or remote system(s) may have been synchronized, or otherwise have obtained, a contacts list of the user and a telephone number of the user. In this way, if the user utters a voice command of "Please call Alice," the user devices and/or remote system(s) may identify a contact named "Alice" from the contact list of the user, and initiate a voice call with the contact, such as by a traditional cable telephone line or over a network using a Voice over Internet Protocol (VoIP) (e.g., Real-time Transport Protocol (RTP), Skype Protocol, etc.).

To perform calls using various user devices, the user devices and/or remote system(s) that work in conjunction with the user devices may require private or sensitive information from a user, such as their contacts list, their telephone number, access to information obtained by their user devices, and so forth. Due to the privacy of this type of information, and other types of information utilized herein, the user may be required to give permission to the remote system(s) to perform the techniques described herein. Stated otherwise, the remote system(s) may, in some examples, require that the user "set-up," request, or otherwise permit the remote system(s) to obtain various types of information described herein from the user. In this way, users are able to determine what, if any, information is utilized and/or obtained by the remote system(s).

If a user has a single user device, then a voice call may simply be conducted using the single user device, potentially in combination with remote systems. For example, the user device may include a microphone to detect speech of the user and generate audio call data to be transmitted over the network (e.g., the Internet, LANs, WANs, etc.) using a VoIP to a remote user device of the contact, receive audio call data from the remote user device, and output sound corresponding to the audio call data received from the remote user device to facilitate dialogue for the voice call. However, if multiple user devices are in a same environment (e.g., a same room, adjoining rooms, a same floor of a building, a same house, etc.), it may increase the difficulty for determining which user device is to capture speech of the user and/or output sound for audio call data received from the remote user device. Even further, if the user has multiple user devices and moves between different environments, such as different rooms and/or floors, the user device may be unable to detect speech of the user, and the user may be unable to hear sound output by the user device for the voice call.

User devices may include various sensors and components to receive and help respond to voice commands from users. For example, user devices may include one or more microphones to generate audio data that represents voice commands of users, and one or more speakers to output sound for users. Additionally, the user devices may include various components to process the audio data, such as speech-processing components. The user devices may be configured to analyze the audio data representing voice commands of the users, and perform various operations, in conjunction with one or more remote computing devices, that are responsive to the voice commands, such as conducting a voice call, conducting a video call, streaming music, ordering items online, scheduling calendar appointments, setting alarms, and so forth.

However, in some examples the user devices have relatively low functionality with respect to processing of the audio data representing voice commands of users. For example, the user devices that are voice-enabled may include pre-processing components to perform less complicated processing on audio data, such as beamforming components, echo-cancellation components, wake-word detection components, and so forth. In such examples, the user devices may serve as an interface or "middle man" between one or more remote systems and a user. In this way, the more intensive processing involved in speech processing may be performed using resources of remote systems, which may increase the performance of the speech-processing techniques utilized on audio data generated by the user devices. For example, while the user devices may be configured with components for determining that the user is issuing a voice command (e.g., a wake word detection component), in some examples the user devices may relay the audio data representing voice commands to a speech-processing system which performs processing techniques on the audio data to determine how to respond to voice commands of the users.

Thus, in some examples, techniques described herein for performing voice processing may be performed by a speech processing or other type of remote system (e.g., "cloud-based system," "software as a service (SaaS) system," "network-accessible system," etc.) which receives data from the user device that are voice-enabled and is located remotely from the voice-enabled devices. Each of the voice-enabled devices may access the remote system through a communications network, such as the Internet, to provide the remote system with the captured audio data that includes a command to, for example, perform a voice call. In various examples, the voice-enabled devices may receive a "wake" trigger (e.g., wake word, button input, etc.) which indicates to the voice-enabled devices that a user is speaking a command, and the voice-enabled devices begin streaming audio data representing the spoken command to the network-based speech service.

Thus, the remote speech-processing system may receive audio data from one or more voice-enabled devices which represents a voice command of the user, and determine that the voice command includes a request to perform a call, such as a voice call and/or video call, with a remote user device. The remote speech-processing system may then provide an indication, or a command, to the communications system that the user would like to conduct a call using their user devices with a contact.

The communications system, which may be physically, functionally, or otherwise separate from the speech-processing system, may receive other types of input data indicating that the user would like to perform a call using a user device (e.g., provide input via an application executing on a user's mobile device, interact with a button on a user device, etc.). In such examples, the communications system may determine which user devices are associated with the user requesting the call, such as by identifying user devices registered with a user profile and/or a household profile of the user.

Upon determining that the user has requested that a call be performed using one or more of their user devices, the communications system may determine a device with which the user wishes to perform the call with. For instance, the remote system may process a voice command of "Please call Alice," identify a contact from the user's contact list named Alice, and instruct the communications system to initiate one or more connections with a remote user device associated with the contact Alice based on a phone number of Alice in the contacts list. The communications system may facilitate, establish, or otherwise cause network-based communication connection(s) to be established between a user device of the user and the remote user device of the contact. For example, the user device from which the request to perform a call came from may be selected as an initial user device for performing the call. In such an example, the communications system may cause a network-based connection to be established between the selected user device and the remote user device using one or more protocols, such as a Session Initiation Protocol (SIP). The one or more protocols, such as the SIP, may initiate, maintain, and/or modify real-time and/or near real-time communication sessions which involve the transmission of one or more of video data, audio call data, messaging, and/or other communications between two or more endpoint devices over Internet Protocol (IP) networks. Once the SIP has initiated or established the requested network-based connection, the selected user device and the remote user device may begin transmitting data back and forth using one or more protocols, such as a Real-time Transport Protocol (RTP), or any other protocols (e.g., Skype Protocol, H.323 Protocol, etc.). In this way, the communications system may work in conjunction with a user device to facilitate a requested call with a remote user device.

To perform techniques described herein, the communications system may receive various types of information from user devices of the user to determine a location of the user relative to the user devices in one or more environments in which the user may move. As the user moves through the environment(s), the communications system may transition the flow of data of the call from one user device to another user device that may be closer to the user, or otherwise in a better position to detect speech of the user, and/or to output sound and/or video for the user. In order to determine a position of the user as they move through the environment(s), the communications system may receive information from the user devices, or other devices in the environment(s), to identify a proximity of the user to the user devices.

Various techniques and types of information may be utilized to determine a proximity of the user to various user devices. For example, the communications system may determine additional user devices associated with the user, such as by identifying the user devices registered with a user and/or household account of the user. Because the communications system received permission from the user, the communications system may initiate or establish network-based connections with one or more of the user devices in addition to the user device that is conducting the call with the remote user device. For example, the communications system may utilize the SIP to initiate a network-based connection with additional user devices, and continuously, periodically, or upon a trigger event, receive data from the additional user devices using the RTP. For instance, the communications system may receive audio data, video data, and/or image data from the additional user devices to determine a proximity of the user from the additional user devices.

To illustrate a specific example, a user may request that a call be initiated, where the call is initiated between a first user device in the environment(s) of the user and a remote user device of a contact of the user. The communications system may cause the network-based connection to be established and maintained using, for example, VoIP between the first user device and the remote user device. Further, the communications system may establish another network-based connection between a second user device associated with the user and the remote system itself, and receive audio data (and potentially other data) from the second user device using the network-based connection using, for example, VoIP. The communications system may analyze the audio call data being sent from the first user device and the remote user device, and also analyze audio data received from the second user device, to determine proximities between the two devices and the user. For instance, the communications system may analyze the audio call data sent from the first user device to the remote user device to identify a volume of speech of the user detected at the first user device, such as by identifying a signal amplitude representing the speech of the user. Similarly, the communications system may analyze the audio data received from the second user device to identify a volume of the speech of the user detected at the second user device, such as by identifying a signal amplitude representing the speech of the user in the audio data, SNR values for the speech in the audio data, energy-levels for a frequency range of the speech in the audio data, etc. The respective audio-data characteristics of the audio call data and the audio data which represent the speech of the user may correspond to the "loudness" of the user's speech detected at the respective devices. In this way, the communications system is able to determine, based on the "loudness" of the user's speech detected at the two user devices and represented in the respective audio data, the proximity of the user from the first and second user devices. However, other types of data may additionally, or alternatively, be utilized to determine the proximity of the user to the first and second user devices, such as image data captured by an imaging device, video data captured by a recording device, and so forth.

Upon determining the respective proximity of, or respective distance between, the user and the first and second user devices, the communications system may determine to transition at least a portion of the flow of audio call data from the first user device to the second user device. For instance, the communications system may determine that, because the user is closer to the second user device than the first user device, the flow of the audio call data should be transitioned from the first user device to the second user device so the user is able to hear the audio call data received from the remote user device more easily when output by the second user device, and the second user device is able to generate and transmit audio call data to the remote user device which more strongly represents or captures the speech of the user. Thus, in some examples the communications system may transfer the flow of audio call data from a first user device to a second user device based at least in part on determining that the user is closer to the second device than the first device.

In some examples, the communications system may utilize additional techniques for determining whether to transition the flow of data from a first user device to a second user device. In some examples, transitioning the flow of data from the first user device to the second user device based on the user being closer to the second user device may result in rapid switching of the flow of data between devices. For instance, the user may move back-and-forth in the environment(s) repeatedly over a distance such that the user moves closer to the first user device, and then moves back to being closer to the user device. Rapid transitioning of the flow of data between the user devices may be undesirable for certain users.

Thus, in some examples, rather than transitioning the flow of data from a first user device to a second user device based on the user being closer to the second user device, the communications system may determine that the user is closer to the second user device by more than a threshold distance before transitioning the flow of data from the first user device to the second user device. For example, if the distance between the user and the first user device is D1, and the distance between the user and the second user device is D2, the communications system may refrain from transitioning the flow of data from the first user device to the second user device until the remote system determines that $D1-D2 \geq T$, where T is a threshold distance that is predetermined, or dynamically determined, based on various data (e.g., quality/number of microphones of the user devices, quality/number of speakers of the user devices, etc.). In this way, the user may move into closer proximity to the second user device than past a halfway or midway point between the devices before the flow of data is transitioned from the first user device to the second user device. Similarly, once the flow of data has been transitioned to the second user device, the user must move back into closer proximity to the first user device than the halfway point between the devices before the flow of data is transitioned back from the second user device to the first user device.

In some examples, the communications system may continuously, periodically, or upon a trigger event/condition (e.g., a user device detects speech of a user over a threshold volume), determine whether the distances between the user and respective multiple user devices warrants a transition of the flow of data from one user device to another user device.

Although the techniques described above are with reference to audio call data, the techniques are equality applicable to other types of data, such as video data and/or image data being communicated between a user device and a remote contact device. For instance, user devices that include displays and/or cameras, or are communicatively coupled to displays and/or cameras, may similarly have video data flows transitioned between each one another using similar techniques as those described above. In some examples, the threshold distance D may be different than, or the same as, the threshold distance D for the audio call data. Even further, the flow of different types of data may be split between the multiple user devices. As an example, if the user requests a video call with the remote user device, then video data may be presented by a first user device despite the audio call data flow being transitioned to a second user device.

In some examples, rather than utilizing the threshold distance D, the communications system may additionally, or alternatively, utilize a threshold time period before switching the data flow between multiple devices. For instance, the communications system may determine that the user is closer to the second user device than the first user device, wait for a threshold period of time, and if the user is still closer to the second user device, the communications system may transition the flow of data from the first user device to the second user device.

The techniques described herein improve the functioning and capabilities of user devices, and/or associated systems, in various ways. For instance, users who have multiple user devices in their homes, for instance, may move freely through environment(s), such as different rooms, while conducting a call with a remote user device. Further, the data transmitted from the user devices of the user to the remote user device may represent or correspond to the user's speech more strongly or accurately than if the flow of data was not transitioned between various user devices. For example, without utilizing the techniques described herein, the contact associated with the remote user device may have difficulty hearing the user when the user moves away from a user device, and the user may have difficulty hearing the contact as well. Thus, the techniques described herein target technological improvements to the functioning of communication devices, such as voice-enabled devices. While some of the techniques described herein may be with reference to voice-enabled devices that are capable of being controlled by noises, such as voice commands, the techniques are equally applicable to any type of device which include at least one input/output component usable to perform techniques described herein, such as microphones, speakers, displays, cameras, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment in which a user moves through an environment while having a call with a remote user device of a contact of the user, and flow of data for the call is transitioned between multiple user devices in the environment of the user based on a position of the user in the environment.

The schematic diagram 100 of FIG. 1 illustrates a user 102 "Steve" at two different time periods being at different positions in a local environment 104. The local environment 104 is depicted as a room, but the local environment 104 may comprise multiple rooms that are adjoined to each other, different floors in a building, or any type of environment(s). The user 102 "Steve" may utter a voice command 106, such as "Please call Alice," in the local environment 104. The local environment 104 of the user 102 "Steve" may include various devices, including a first user device 108(1) and a second user device 108(2) (collectively "user devices 108"). As shown, the user 102 "Steve" issues the voice command 106 during an initial-time period (T1) 110 when the user 102 "Steve" is more near the user device 108(1) than the user device 108(2).

In this example, the voice command 106 of "Please call Alice" may be a request that the user devices 108 conduct a call (e.g., voice call, video call, etc.) with a contact "Alice" 112 of the user 102 "Steve". As shown, the contact "Alice" 112 is positioned in a remote environment 114 from the user 102 "Steve," and is near a remote user device 116 with which the user 102 "Steve" may be requesting to use for the requested call.

The user 102 "Steve" may issue the voice command 106 in the local environment 104 that includes the user 102 "Steve" who is speaking the voice command 106, and the user device 108(1), and potentially the user device 108(2), located in the local environment 104 may each detect or receive the voice command 106. For example, the user devices 108 may each have one or more microphones that are used to capture user speech, such as the voice command 106, and one or more speakers that are used to play speech (e.g., dialogue) and content. In some embodiments, the user devices 108 may be designed to operate from a fixed location, and in other embodiments, the user devices 108 may be portable or mobile. For instance, the user devices 108 may comprise handheld devices or other mobile devices, such as smartphones, tablet computers, media players, personal computers, wearable devices, various types of accessories, or any other type of computing device.

As illustrated, the user 102 "Steve" may be located in and speak the voice command 106 in the local environment 104 that includes the user devices 108(1) and 108(2). In such examples, one or both of the user devices 108(1) and 108(2) may detect, or receive, the voice command 106, generate audio data representing the voice command 106, and transmit, stream, or otherwise send the audio data over a network 118 to a remote system 120. The user devices 108 may receive commands from the user 102 "Steve" via the voice command 106, and provide services in response to the commands along with the remote service 120. In some examples, the user devices 108 may detect a predefined trigger expression or word (e.g., "awake"), which may be followed by instructions or directives (e.g., "please end my phone call," "please turn off the alarm," etc.). Services provided by the user devices 108 along with the remote system 120 may include performing voice/video calls, performing actions or activities, rendering media, obtaining, and/or providing information, providing information via generated or synthesized speech via the user devices 108, initiating Internet-based services on behalf of the user 102 "Steve", and so forth.

In this example, the user devices 108(1) and/or 108(2) may receive or capture sound corresponding to the voice command 106 of the user 102 via one or more microphones. In certain implementations, the voice command 106 may include or be preceded by a wakeword or other trigger expression or event that is spoken by the user 102 to indicate that subsequent user speech is intended to be received and acted upon by the user devices 108 and/or remote system 120. The user devices 108 may detect the wakeword and begin streaming audio data to the remote system 120. In some instances, the user devices 108 may operate in a low-functionality mode and analyze sound using ASR processing. When the wakeword is detected using ASR, the user devices 108 may begin streaming the audio data, and potentially additional data, to the remote system 120. The wakeword may be a reserved keyword that is detected locally by the user devices 108, such as by using an expression detector that analyzed audio signals produced by the microphones of the user devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In the example illustrated in local environment 104, the user 102 issues the voice command 106 subsequent to a wakeword, which the user device 108(1) and/or detect or capture. However, in some examples the user device 108(2) may not detect the voice command 106 as it is positioned across the local environment 104. At least the user device 108(1) may produce audio data representing the voice command 106. In some examples, the audio data may represent other sounds that may trigger a response, such as glass breaking, an appliance beeping, a smoke alarm sounding, a baby crying, etc. Additionally, the user devices 108(1) and/or 108(2) various additional data associated with the voice command 106 and/or the circumstances involving the user devices 108(1) and 108(2). For instance, one or both of the user devices 108(1) and 108(2) may utilize a camera to capture image data and/or video data representing the local environment 104. Further, one or both of the user devices 108(1) and 108(2) may utilize various proximity sensors, motion sensors, etc., to detect movement of the use 102 and/or a proximity of the user 102 to the user devices 108(1) and 108(2).

As one example, the user devices 108(1) and 108(2) may be located at different locations and at different distances from the user 102. In these circumstances, each of the user devices 108(1) and 108(2) may be able to detect the voice command 106, but the audio data generated by each of the user devices 108(1) and 108(2) may have different characteristics or attributes. The characteristics of the audio data may comprise any type of data associated with its respective audio data and/or its respective user device 108. For instance, the audio data characteristic(s) may indicate a characteristic of associated audio data, such as a signal amplitude representing the voice command 106 of the user 102, signal-to-noise value, a spectral centroid measure, a voice-energy level, a noise-energy level, a spectral flux, a particular percentile frequency, a clarify, a harmonicity, the level of voice presence detected in the audio signal, an amplitude of the audio signal, etc. One or both of user devices 108(1) and 108(2) may send one or more of respective audio data, respective metadata (e.g., audio data characteristics of the audio data,), and/or additional data (e.g., image data, video data, proximity data, etc.) to the remote system 120 and/or a communications system 122 over the one or more networks 118.

Herein, each of the user devices 108(1) and 108(2) may initiate communication with the remote system 120 to process the voice command 106 by sending the audio data that are determined at the respective user device 108, and may also send metadata for each of the different audio data streams to the communications system 122. Each of the different metadata may generally indicate a characteristic of an associated audio data, such as a signal amplitude representing the voice command 106 of the user 102, signal-to-noise ratio, a spectral centroid measure, a speech energy level, a spectral flux, a particular percentile frequency, a clarify, a harmonicity, the level of voice presence detected in the audio signal, an amplitude of the audio signal, etc. Further, the user devices 108(1) and 108(2) may send the additional types of data to the remote system 120.

Figure 4:
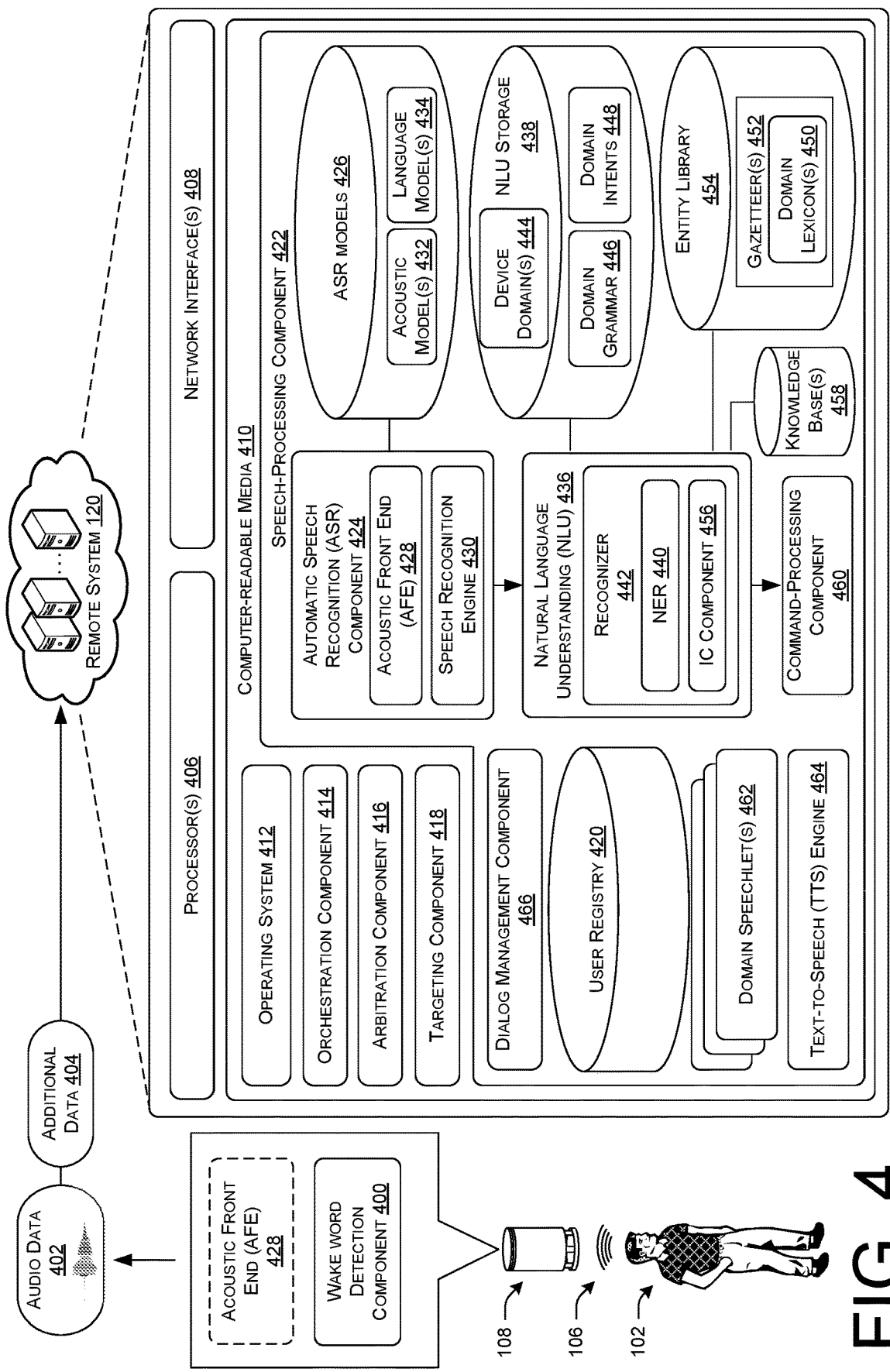
FIG. 4 illustrates a block diagram of an example architecture of a speech-processing system which receives audio data and/or additional data from user devices, and performs techniques to determine how to respond to a voice command of a user represented in the audio data.

The remote system 120 may include various components for determining a command that is responsive to the voice command 106 of the user 102, as described in more detail with respect to FIG. 4. The remote system 120 may determine that the voice command 106 includes the request to call the contact "Alice," and provide data to the communications system 122 indicating the user 102 would like to conduct a call with their contact "Alice" 112.

In various examples, the audio data and/or additional data may be sent to the remote system 120 and/or communications system 122 over one or more networks 118. The one or more networks 118 may include any viable communication technology, such as wired and/or wireless modalities and/or technologies. Networks 118 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The remote system 120 may process audio data (or audio signals) received from the user devices 108 and formulate responses to the user 102 along with determining which of the user devices 108 is to perform an action responsive to the voice command 106. The remote system 120, and the communications system 122, may be implemented as separate groupings of one or more computing devices including one or more servers, desktop computers, laptop computers, or the like. In one example, the remote system 120 and the communications system 122 are configured in a server cluster, server farm, data center, mainframe, cloud computing environment, or a combination thereof. To illustrate, the remote system 120 and the communications system 122 may include any number of devices that operate as a distributed computing resource (e.g., cloud computing, hosted computing, etc.) that provides services, such as storage, computing, networking, and so on.

In some examples, the communications system 122 may include one or more processors 124, one or more network interfaces 126 to communicate over wireless and/or wired networks, and computer-readable media 128 storing various components for managing calls between devices of users, determining which devices 108 are to conduct a call, and various other functions. The processors 124 may power the components of the communications system 122, such as components stored in the computer-readable media 128. In some examples, the computer-readable media 128 includes a connection-management component 130, described in more detail in FIGS. 5A, 5B, 6A and 6B, which manages the flow of audio data between user devices 108 based on audio characteristics of the audio data representing speech of the user 102.

In some examples, the remote system 120 may receive one or more audio data streams from the user device 108(1) and/or 108(2). For instance, both of the user devices 108(1) and 108(2) may send audio data representing the same voice command 106 to the remote system 120 upon detecting the wake word, and the subsequent voice command 106. In examples where both of the user devices 108(1) and 108(2) send audio data representing the voice command, the remote system 120 may select one of the audio data streams for further processing based on characteristics of the audio data streams, such as signal-to-noise (SNR) ratios or values for the audio data streams. For instance, an arbitration component of the remote system 120 may determine which of the multiple audio data streams received will be used for further processing. Generally, audio data or signals with certain characteristics or qualities are easier for speech-processing techniques. For example, many speech-processing techniques often include transcribing, or converting, the audio data representing voice commands 106 into text. Audio data that represents the voice command 106 with better quality or accuracy may result in more accurate transcription of the voice command 106 into text. For instance, audio data with higher signal-to-noise values or ratios may represent the voice command 106 better than the background noise, which makes transaction of the audio data including the voice command 106 into text. Thus, the arbitration component of the remote system may analyze the audio data received from each of the user devices 108(1) and 108(2) and determine which audio data has the highest SNR value, or other audio or acoustic metric, and select that stream of audio data for further processing. The arbitration component may further send an instruction for the user device 108(2) whose audio data stream was not selected to stop sending the audio data. In this way, when multiple user devices 108 detect or capture a same voice command 106, the arbitration component of the remote system 120 may select or utilize the audio data with a higher quality representation of the voice command 106, and stop the other user devices 108 from transmitting their respective audio data streams.

The remote system 120 may include a speech-processing component, which in turn may further include components to perform speech processing on the audio data selected by the arbitration component, and determine which user device 108 is to respond to a voice command 106 of the user 102. The speech-processing component of the remote system 120 may include an orchestration component that calls or communicates with an automatic speech recognition (ASR) component, and a natural language understanding (NLU) component for processing the audio data. For example, the orchestration component may stream the audio data to the ASR component, which detects the voice command 106 endpoint and sends a message to the user device 108(1) to close the stream of the audio data. In some instances, the ASR component of the remote system 120 may process the audio data at to determine textual data which corresponds to the voice command 106. In some examples, the ASR component may generate ASR confidence scores representing the likelihood that a particular set of words of the textual data matches those spoken in the voice command 106. For instance, the ASR component may determine a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR component may then return the textual data to the orchestration component. While the audio data characteristics (e.g., SRN values, signal amplitudes, etc.) may be determined at the user devices 108, in other examples, some or all of the audio data characteristics may be determined by components of the remote system 120, such as ASR component, arbitration component, and/or NLU component. For instance, the user devices 108 may stream raw audio signals to the remote system 120 representing the voice commands 106 without performing any pre-processing.

In various examples, the textual data corresponding to the voice command 106 may be sent from the orchestration component to the NLU component to be analyzed or processed by the NLU component to determine an intent expressed by the user 102 in the voice command 106. For example, because the user 102 issued a command to "Please call Alice," the NLU component may determine that the user's intent is to have a user device 108(1) conduct a call with the contact "Alice" 112 of the user 104. Once the intent has been determined by the NLU component, the orchestration component may pass the intent to a targeting component to use to determine which of the user devices 108(1) is to respond to the voice command 106. In some examples, the ASR component and/or the NLU component may detect various types of sound in the audio data other than, or in combination with, a voice command 106. For instance, rather than a voice command 106 being included in the audio data, the ASR component and NLU component may detect sounds such as glass breaking, an appliance beeping, a smoke alarm sounding, a baby crying, and/or other sounds which might map to an intent and/or action for the remote system 120 to perform.

The targeting component of the speech-processing component of the remote system 120 may determine which user device 108 is to respond to the voice command 106 based on the intent received from the NLU component, and potentially other data. In some examples, the targeting component may select the user device 108(1) as the device 108 to respond to the voice command 106 because the audio data received from the user device 108(1) indicates that the user 102 is more clearly heard by that device 108(1). However, in some examples the targeting component may determine which user device 108 to use based on other data, such as capabilities of the different user devices 108. For instance, if the user 102 requested to "Please play a movie," the targeting component of the speech-processing system may select the user device 108(1) to perform the operation because it is controlling a television regardless of which of the user devices 108(1) and 108(2) heard the user 102 more clearly. The remote system 120 may provide an indication of which of the user devices 108 is to perform the call, along with other information, to the communications system 122. For instance, the remote system 120 may provide, to the communications system 122, a command or other data to facilitate a call between a user device 108 and the remote user device 116, an indication (e.g., device ID, IP address, phone number, etc.) of the user device 108, a similar indication of the remote user device, and/or other data.

In the example of FIG. 1, the remote system 120 may determine that the user 102 is requesting that the user device 108(1) perform a call, and provide information to the communications system 122 which utilizes a connection-management component 130 to at least partly orchestrate or establish the call. In order to determine a contact device with which to perform the call, or to determine who "Alice" is, the communications system 122 may store various information for users 102 of the communications system 122 in one or more user-information databases 132. For instance, the user-information database(s) 132 may store a user registry 134 which indicates various one or more profiles 136 of the user 102. The profiles 136 may include various types of profiles 136, such as user profiles 136 indicating the user devices 108 that have been registered with a user 102, household profiles 136 indicating the user devices 108 that have been registered with a household, and so forth. The communications system 122 may have previously requested permission to obtain various private information of the user 102, and stored that information in the user registry 134. For instance, the communications system 122 may have requested that the user 102 "opt in" or otherwise request, sign up for, or register for services that require use of information, such as private information of the user 102. The user 102 may provide various information, such as their contact list and phone numbers, email addresses, etc., for their contacts, the user's 102 phone number, and/or other data to be used by the communications system 122 and/or remote system 120. In some examples, the contact 112 may also have her devices 108 registered with the communications system 122. For instance, the remote user device 116 may comprise a user device that is registered with the communications system 122 and stored in the user-information database(s) 132. In such examples, the communications system 122 may have information about the remote user device 116, such as a device identifier, an Internet Protocol (IP) address of the remote user device 116, and other information.

Thus, the connection-management component 130 may receive (e.g., from the remote system 120) data indicating, or determine on its own, that the user 102 would like to perform a call with the contact 112 of the user 102, and determine a device address (e.g., IP address, phone number, etc.) associated with the remote user device 116. The connection-management component 130 may generate an instruction to cause the user device 108(1) to establish a network-based connection over the network(s) 118 with the remote user device 116 to be used for the requested call. In some examples, the communications system 122 may establish the network-based connection between the remote user device 116 and the user device 108(1). For instance, the connection-management component 130 may cause the user device 108(1) to establish, using the Session Initiation Protocol (SIP), a network-based connection, such as VoIP, with the remote user device 116. In some examples, the network-based connection may pass through one or more computing devices of the communications system 122. For instance, the various types of data (e.g., audio call data, video data, image data, etc.) communicated back and forth between the user device 108(1) and the remote user device 116 may be communicated using VoIP at least partly through a network-based device of the communications system 122. In some examples, the connection-management component 130 may establish a VoIP connection between the remote user device 116 and the remote system 120, and further establish a VoIP connection with the user device 108(1) and the communications system 122. In this way, the communications system 122 may be disposed as an intermediary server(s) that passes data back and forth between user devices 108 of the user, and remote user devices 116 of the contact 112.

In additional to initializing, establishing, and or maintaining network-based connections between the user device 108(1) and the remote user device 116, the communications system 122 may further establish network-based connections with additional user devices 108 of the user. For instance, the command-processing component 130 may determine, using the user-information database(s) 132, whether other user devices 108 are associated with, or registered with, the user 102 other than the user device 108(1) initially selected during the initial-time period (T1) 110 to perform the call. Based partly on the user 102 having requested a call be performed using the user device 108(1), the communications system 122 may determine that the other user device 108(2) is also registered with the user 102. Because the user device 108(2) is also registered with the user 102, the connection-management component 130 may establish a VoIP connection with the user device 108(2) based on receiving the request from the user 102 to perform a call. The connection-management component 130 may establish or initiate, using the SIP, a connection with the user device 108(2). The connection-management component 130 may then continuously, periodically, or upon a trigger event, "drop in" or otherwise turn on a microphone of the user device 108(2) while the user device 108(1) is conducting the call with the remote user device 116. For instance, the connection-management component 130 may continuously, periodically, or upon a trigger event (e.g., the user device 108(2) detected voice of the user 102 at higher than a threshold volume) receive audio data from the user device 108(2) for further processing. Thus, a first network-based connection (e.g., VoIP) may be established between the user device 108(1) and the remote user device 116, which passes through the communications system 122, for transmitting various types of data. Further, a second network-based connection may be established or initiated using SIP between the communications system 122 and the user device 108(2). At least periodically, the communications system 122 may receive audio data from the user device 108(2) using RTP over the second network-based connection.

The computer-readable media 128 may further store a user-location component 138 to analyze various data received from the user devices 108(1) and 108(2) to determine a location of the user 102 relative to the user devices 108(1) and 108(2). The user-location component 138 may analyze various types of data to determine proximities, or distances, between the user 102 and each of the user devices 108(1) and 108(2). For example, during a subsequent-time period (T2) 140 after the initial-time period (T1) 110, the connection-management component 130 may receive audio data from the user device 108(2) which represents sound in the local environment 104. For instance, the connection-management component 130 may cause the user device 108(2) to activate a microphone to capture the sound. The user-location component 138 may analyze audio data received from the user device 108(1) and the audio data received from the user device 108(2) during the subsequent-time period (T2) 140 in order to determine a first distance (or proximity) between the user 102 and the first user device 108(1), and a second distance between the user 102 and the second user device 108(2).

In some examples, during the subsequent-time period (T2) 140, the user-location component 138 may analyze audio call data sent from the user device 108(1) to the remote user device 116 to determine the first distance between the user 102 and the first user device 108(1). For instance, the user-location component 138 may analyze the audio call data sent from the first user device to the remote user device to identify a volume of speech of the user 102 detected at the first user device 108(1), such as by identifying a signal amplitude representing the speech of the user 102. Similarly, the user-location component 138 may analyze the audio data received from the second user device 108(2) to identify a volume of the speech of the user 102 detected at the second user device 108(2), such as by identifying a signal amplitude representing the speech of the user in the audio data. The respective signal amplitudes in the audio call data and the audio data which represent the speech of the user may correspond to the "loudness" of the user's 102 speech detected at the respective devices 108(1) and 108(2). In this way, the user-location component 138 is able to determine, based on the "loudness" of the user's 102 speech detected at the two user devices 108 and represented in the respective audio data, the proximity of the user 102 from the first and second user devices 108(1) and 108(2).

In some examples, the user-location component 138 may determine, or receive data indicating, various audio signal metrics or values that indicate the loudness of the speech of the user 102 in audio data received from the user devices 108. For instance, the user-location component 138 may determine signal-to-noise ratio (SNR) values for speech of the user 102, energy levels representing speech of the user 102, and so forth. In this way, the user-location component 138 may determine, based at least in part on audio signal values representing the "loudness" of the user's speech, to which of the devices 108(1) and 108(2) the user 102 is closer.

The user-location component 138 may also determine physical distances between the devices 108 and the user 102 using various techniques. For instance, the user-location component 138 may utilize one or more algorithms, such as machine-learning algorithms, to determine that particular signal amplitudes correspond to distances. As an example, if the user-location component 138 determines that a signal amplitude in audio data is a particular value, that value may indicate that the source that emitted the sound represented by the signal amplitude is at a set distance. In addition to machine-learning algorithms that use training data of signal amplitudes and known distances, other types of techniques may be used by the user-location component 138 to determine distances between the user 102 and user devices 108, such as look-up tables storing correlations between signal amplitude values and distances.

The user-location component 138 may be configured to identify portions of audio data that correspond to speech of the user 102, as opposed to background noise. In this way, the user-location component 138 is able to identify signal amplitudes in the audio data that correspond to speech of the user 102 to determine how far the user 102 is from each of the user devices 108. Further, the user-location component 138 may be configured to analyze one or more portions of audio data received from the user device 108(2) that correspond to one or more portions of the audio call data communicated by the user device 108(1) to determine that the signal amplitudes analyzed generally correspond to the same speech of the user 102, or speech made within a threshold period of time (e.g., 1 second, 3 seconds, etc.). In this way, the user-location component 138 may refrain from analyzing audio data from the user device 108(2) representing the use 102 shouting or speaking loudly at one point in time, and analyzing audio call data from the user device 108(1) representing the user 102 speaking more softly. By analyzing the audio data streams received from the user devices 108(1) and 108(2) that are within some threshold period of time, the user-location component 138 may determine distances between the user from the two user devices 108(1) and 108(2).

As described herein, determining "distances" between the user 102 and devices 108 may, in some examples, comprise determining physical distances (e.g., distances in feet, meters, etc.) between the user 102 and the devices 108. In various examples, determining "distances" between the user 102 and devices 108 may comprise determining whether the user 102 is closer to a particular device 108 based on audio signal values (e.g., SNR values, signal amplitudes, energy levels for speech of the user 102, etc.) without actually determining a physical distance value. Thus, in some examples the user-location component 138 may determine actual physical distances between the user 102 and devices 108, and in some examples, the user-location component 138 may determine whether the user 102 is closer to a device 108, or closer by more than a threshold amount to a device 108, based on audio signal characteristics of audio data received from the devices 108 without determining physical distance values.

In addition to analyzing audio data from each of the devices 108(1) and 108(2), the user-location component 138 ay additionally, or alternatively, analyze other types of data to determine distances between the user 102 and the devices 108(1) and 108(2). For example, the communications system 122 may receive additional data from the user devices 108(1) and/or 108(2), such as image data, video data, proximity sensor data, motion sensor data, etc. The data may be obtained by components of the user devices 108, by a device associated with (e.g., communicatively coupled to) the devices 108, or another device in the local environment 104. For instance, one or more of the user device 108(1), user device 108(2), and/or an imaging device 142 may obtain image data, and/or video data, of the local environment at the subsequent-time period (T2) 140, and send that data to the communications system 122. The user-location component 138 may analyze the image data, and/or video data, and determine the distance of the user 102 from each of the user devices 108(1) and 108(2) using various image/video data analysis techniques (e.g., computer vision, image processing, etc.). In some examples, the user-location component 138 may analyze the proximity sensor data obtained by proximity sensors of the user devices 108(1) and/or 108(2), or other devices in the local environment 104. However, any type of sensor or data usable to estimate or determine distances may be analyzed by the user-location component 138 to determine the distances between the user 102 and the user devices 108(1) and 108(2). In various examples, different types of data may be used in conjunction to determine the distances. For instance, the audio data may be used along with image data to determine a more accurate distance between the user and the devices 108(1) and 108(2). Any type of data fusion or sensor fusion may be performed by the user-location component 138 to determine the distances.

Once the user-location component 138 determines, at the subsequent-time period (T2) 140, the first distance between the user 102 and the first user device, and the second distance between the user 102 and the second user device 108(2), a user-device transfer component 144 may determine whether or not to transfer the flow of data between the first user device 108(1) and the remote user device 116 to the second user device 108(2) and the remote user device 116. In some examples, the user-device transfer component 144 may determine that the second distance between the user 102 and the user device 108(2) is less than the first distance between the user 102 and the first user device 108(1). Based on the second distance being less than the first distance. The user-device transfer component 144 may instruct, or cause, the connection-management component 130 to "switch" the flow of data of the call from the user device 108(1) to the user device 108(2). For instance, the connection-management component 130 may instruct, or cause, the first user device 108(1) to stop capturing sound using a microphone in the local environment 104 and/or stop receiving audio data from the remote user device 116, using the VoIP. Further, the connection-management component 130 may instruct, or cause, the second user device 108(2) to being streaming audio data representing sound in the local environment 104 to the remote user device 116 using VoIP over a network-based connection, and receive audio data from the remote user device 116.

In various examples, the user-device transfer component 144 may determine to transition the flow of data from the first user device 108(1) to the second user device 108(2) based on other analysis of the first distance and the second distance. For example, the user-device transfer component 144 may utilize techniques to help prevent rapid switching of the flow of data between devices 108. Thus, rather than transitioning the flow of data from the first user device 108(1) to the second user device 108(2) based on the user 102 being closer to the second user device 108(2), the user-device transfer component 144 may determine that the user 102 is closer to the second user device 108(2) by more than a threshold distance before transitioning the flow of data of the call from the first user device 108(1) to the second user device 108(2). For example, if the distance between the user 102 and the first user device 108(1) is D1, and the distance between the user 102 and the second user device 108(2) is D2, the user-device transfer component 144 may refrain from transitioning the flow of data from the first user device 108(1) to the second user device 108(2) until the user-device transfer component 144 determines that $D1-D2 \geq T$, where T is a threshold distance that is predetermined, or dynamically determined, based on various data (e.g., quality/number of microphones of the user devices 108, quality/number of speakers of the user devices, etc.). In this way, the user 102 may move into closer proximity to the second user device 108(2) than past a halfway or midway point between the devices 108 before the flow of data is transitioned from the first user device 108(1) to the second user device 108(2). Similarly, once the flow of data has been transitioned to the second user device 108(2), the user 102 may have to move back into closer proximity to the first user device 108(1) than the halfway point between the devices 108(1) and 108(2) before the flow of data is transitioned back from the second user device 108(2) to the first user device 108(1).

As illustrated in FIG. 1, the flow of data has been transitioned from the first user device 108(1), leaving an SIP initiated between the communications system 122 and the user device 108(1) (illustrated by the dashed line). The second user device 108(2) is communicating the call data (e.g., audio call data, video call data, etc.) with the remote user device 116 using RTP over a network-based connection.

In some examples, the threshold distance T may be based on a type of user devices 108. For instance, the user-device transfer component 144 may analyze device profiles 146 for the user devices 148, which are associated with proximity thresholds 148. For instance, a device profile 146 may indicate that the associated proximity threshold to be used for a "T" value should be greater such that the user 102 must move a further distance from the user device 108 before the call is switched because the user device 108 may have higher quality speakers and/or microphones. Further, a device profile 146 may indicate that a user device 108 has a display, or controls a display, and the proximity thresholds 148 may indicate a first threshold for transitioning the flow of audio data to and from the user device 108 associated with the display, and also a proximity threshold 148 that indicates a second threshold for transitioning the flow of video data to and from the user device 108 associated with the display. In some examples, the proximity thresholds 148 may be the same for transferring the flow of audio data and video data, and sometime the proximity thresholds 148 may be different for audio data and video data transfer, as described in FIGS. 3A, 3B, 3C, and 3D. In some examples, the user-device transfer component 144 may refrain from transferring certain flows of data based on device capabilities of the devices 108. For instance, if the first user device 108(1) is sending image/video data captured by a camera of the device 108(1) and/or receiving and display image/video data using a display of the device 108(1), the user-device transfer component 144 may refrain from transferring the communication of one or both of the image data and/or video data between the device 108(1) and the remote user device 116 if the device 108(2) does not include one or both of a camera or display. The user-device transfer component 144 may transfer audio data flow from device 108(1) to device 108(2), but refrain from transferring image/video data from the device 108(1) to the device 108(2). Thus, the user-device transfer component 144 may determine whether or not to transfer the flow of various types of data between devices 108 based on various information stored in the user-information database(s) 134, such as device types, device profiles 146, proximity thresholds 148, device capabilities, and so forth.

Although the techniques described herein are with reference to two user devices 108 in the local environment 104, the techniques are scalable for any number of devices 108. Further, the devices utilized need not be user devices, and the techniques are equally applicable to any type of device with at least one component for capturing and/or communicating data (e.g., microphone, speaker, camera, display, proximity sensor, motion sensor, network interface, etc.).

The network interface(s) 126 of the communications system 122 may include one or more network interfaces to receive data, such as audio data, video data, image data, or any other data, from devices. The network interface(s) 126 may include wired or wireless interfaces, such as a wireless or Wi-Fi network communications interface, an Ethernet communications interface, a cellular network communications interface, a Bluetooth communications interface, etc., for communications with the user devices 108 over various types of networks 118, including wide-area network, local-area networks, private networks, public networks etc. In the case of a wireless communications interfaces, such interfaces may include radio transceivers and associated control circuits and logic for implementing appropriate communication protocols (e.g., SIP, RTP, Skype, VoIP, etc.).

FIGS. 2A, 2B, 2C, and 2D illustrate schematic diagrams 200 of illustrative environments through which a user moves while conducting a voice call, and further illustrate a remote system transitioning the flow of data of the voice call between multiple user devices based on a location of the user relative to multiple user devices in the environment.

Figure 2A:
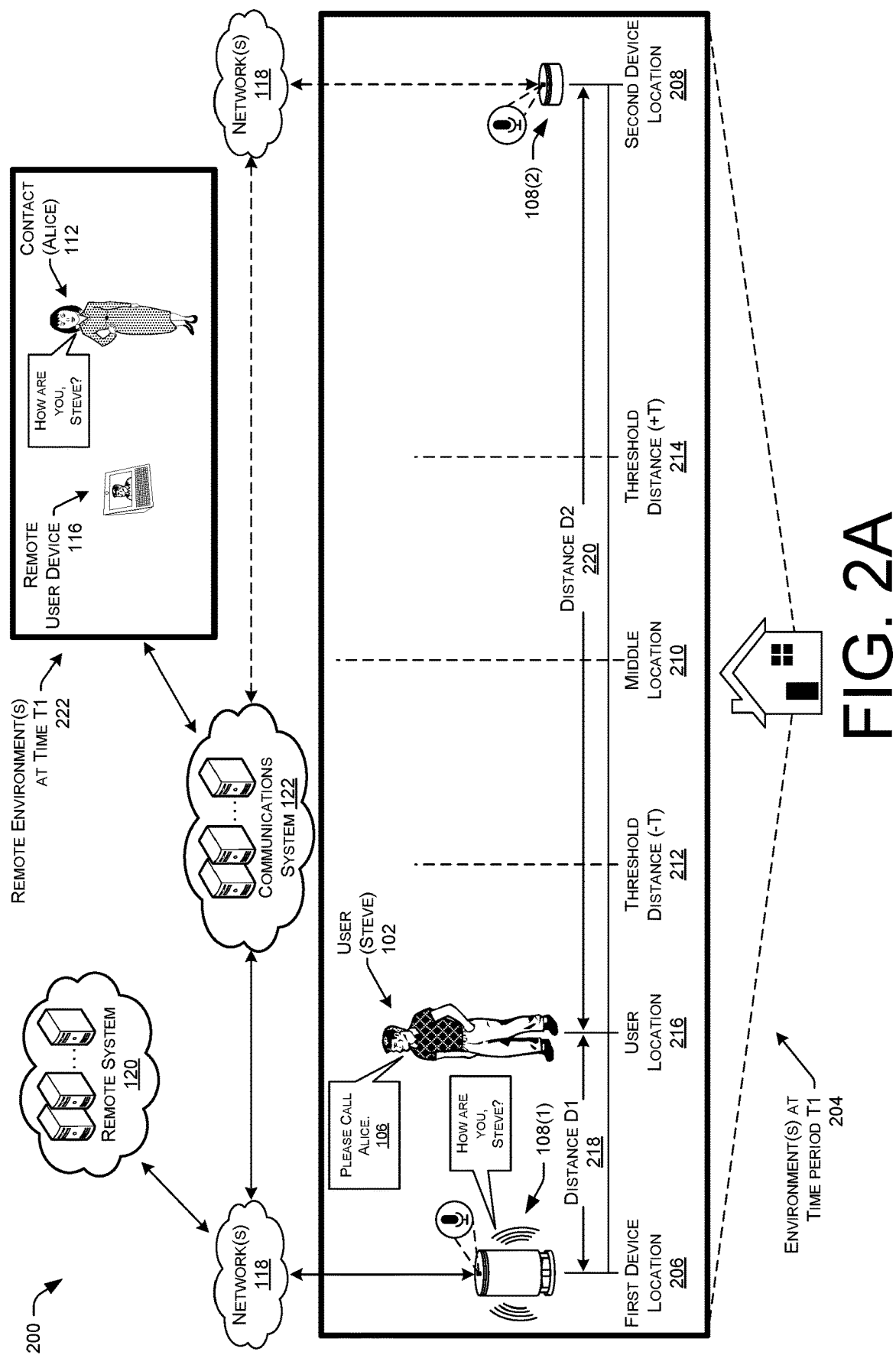

As shown in FIG. 2A, the user 102 is located in one or more environments (e.g., one or more rooms, one or more floors in a building, etc.) at a time period T1 204, and utters a voice command 106 to "Please call Alice." The environment(s) at the time period T1 204 may include a first user device 108(1) (or "device 108(1)") located at a first device location 206, and a second user device 108(2) (or "device 108(2)") located at a second device location 208. The device 108(1) may be positioned a distance away from the second device 108(2) in the environment(s) at time period T1 204 that has a middle location 210 between the devices 108(2) and 108(2). Further, based on various information, such as the types of devices 108, the capabilities of the devices 108, the amount or types of components of the devices 108 (e.g., microphones, cameras, speakers, etc.), the user-device transfer component 144 may define a threshold distance (−T) 212 and a threshold distance (+T) 214 which define threshold distances that the user 102 may move past in order for the user-device transfer component 144 to transfer data flow between the device 108(1) and the device 108(2).

As illustrated, the connection-management component 130 of the communications system 122 may have caused a first network-based connection to be initiated or established between the first device 108(1) and the remote user device 116 by which the device 108(1) and the remote user device 116 are communicating at least audio call data. Further, the connection-management component 130 may have initiated, using the SIP for example, a second network-based connection between the second device 108(2) and the communications system 122. The user maybe positioned at user location 216, which is a distance D1 218 from the first device location 206 of the first device 108(1). In the environment(s) at time period T1 204, the user may request and conduct a call using the first device 108(1) with the remote user device 116 of the contact "Alice" 112. Further, the user location 216 of the user 102 may be a distance D2 220 from the second device location 208. In this example, the distance D1 218 is smaller than the distance D2, and the communications system 122 may utilize the first device 108(1) to perform the call.

Figure 2B:
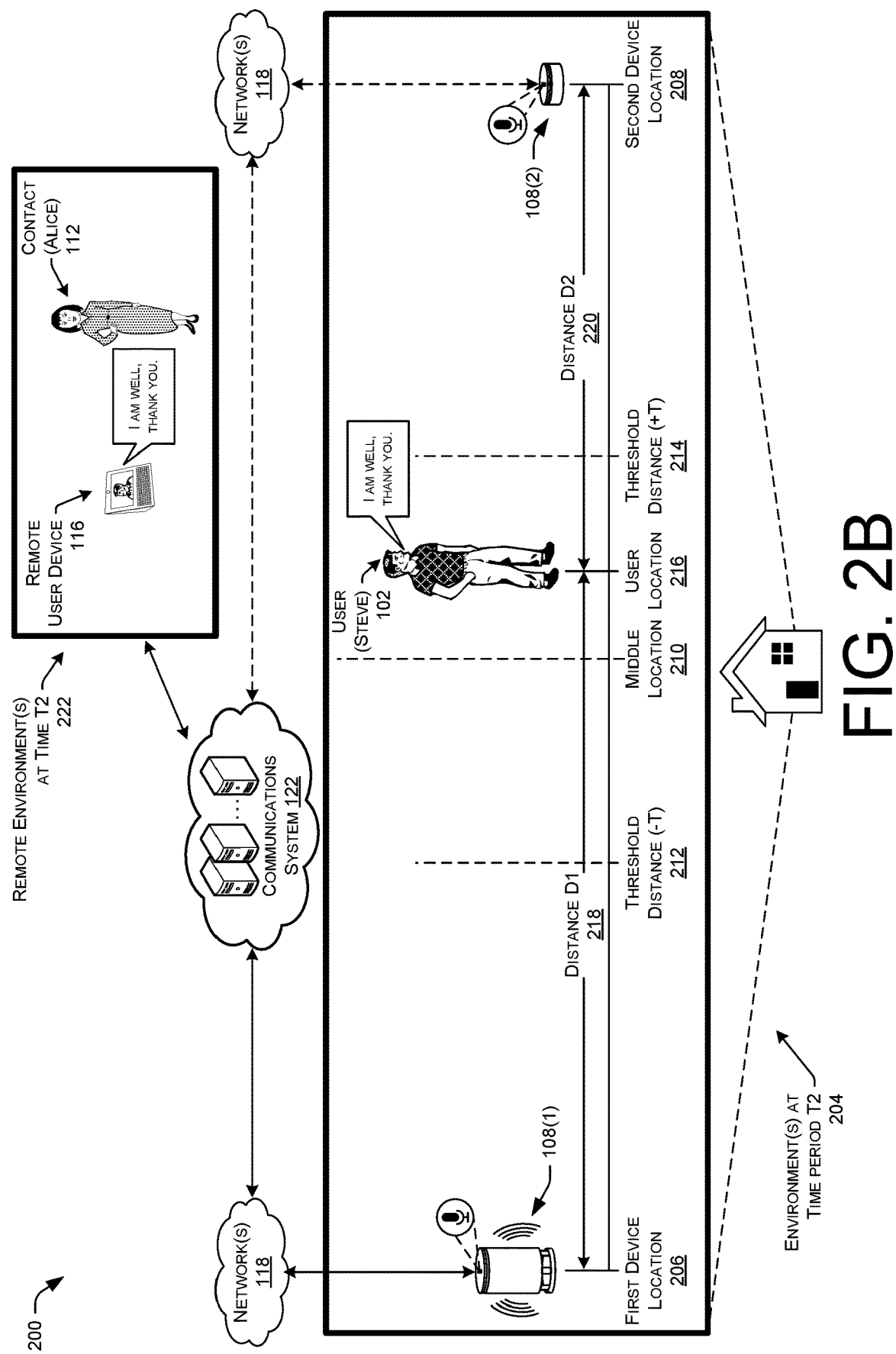

FIG. 2B illustrates the schematic diagram 200 where the user 102 has moved to a new user location 216 in the environment(s) at a time period T2 204. In some examples, because the user 102 has moved past the middle location 210 between the first device location 206 and the second device location 208, the user-device transfer component 144 may cause the connection-management component 130 to cause the data flow of the call to transition from the first device 108(1) to the second device 108(2). However, in some examples, as illustrated in FIG. 2B, the user-device transfer component 144 may determine that, based on the user location 216, the user 102 has not moved past the additional threshold distance (+T) to transition the data flow of the call from the first device 108(1) to the second device 108(2). Thus, to prevent rapid switching of the flow of data between the devices 108(1) and 108(2), the user-device transfer component 144 may refrain from transitioning the data flow of the call from the first device 108(1) to the second device 108(2). More specifically, the user-device transfer component 144 may determine that a difference between the distance D1 218 between the first device location 206 and the user location 216 and the distance D2 220 between the user location 216 and the second device location 208 is greater than or equal to the threshold distance (+T) 214. Based on this, the user-device transfer component 144 may refrain from switching the flow of the audio data from the first device 108(1) to the second device 108(2) to prevent rapid switching of the data flow.

Figure 2C:
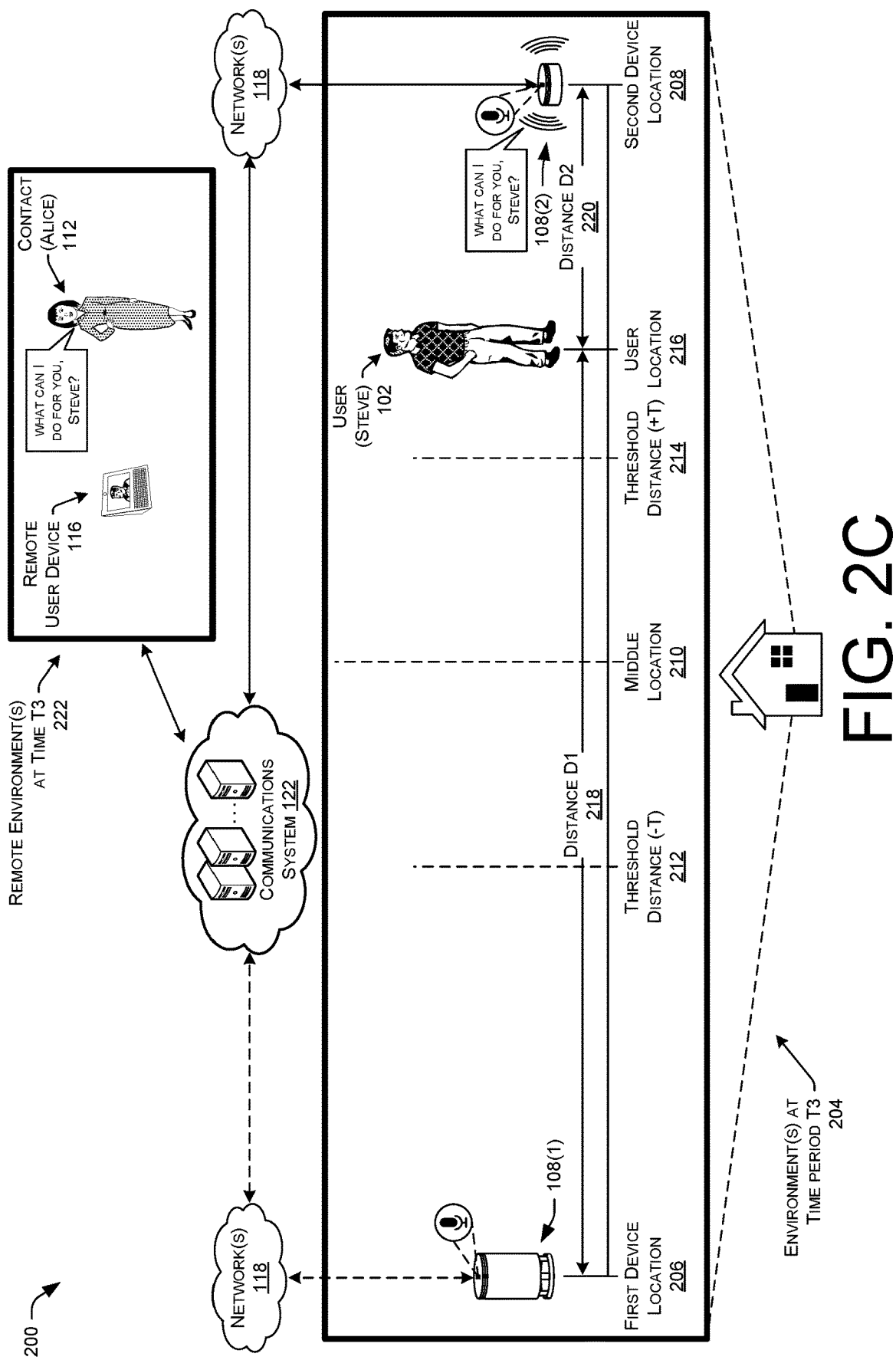

FIG. 2C illustrates the schematic diagram 200 where the user 102 has moved to a new user location 216 in the environment(s) at a time period T3 204. In some examples, because the user 102 has moved past the threshold distance (+T) 214, the user-device transfer component 144 may cause the connection-management component 130 to cause the data flow of the call to transition from the first device 108(1) to the second device 108(2). For instance, the user-device transfer component 144 may determine that the user 102 is close enough to the second device location 208 that rapid switching of the data flow of the call between the first device 108(1) and the second device 108(2) is less likely to occur than if the user 102 had simply moved past the middle location 210. Thus, the user-device transfer component 144 may cause the connection-management component 130 to transfer the flow of data of the call to transition from the first device 108(1) to the second device 108(2) during the time period T2 because the user location 216 is past the threshold distance (+) 214 from the first device location 206.

FIG. 2D illustrates the schematic diagram 200 where the user 102 has moved to a new user location 216, in the environment(s) 204 at time a time period T4. As illustrated, the user 102 has moved past the middle location 210, but has not moved past the threshold distance (−T) 212. In light of this, the user-device transfer component 144 may not switch the stream of audio data from the second user device 108(2). The audio data is still being communicated to the second user device 108(2) because the user 102 has not moved past the threshold distance (−T) to transition the flow of audio data. In this way, more rapid transitioning of audio data between the user devices 108(1) and 108(2) may be prevented.

FIGS. 3A, 3B, 3C, and 3D illustrate schematic diagrams of illustrative environments through which a user moves while conducting a video call, and further illustrate a remote system transitioning the flow of data of the video call between multiple user devices based on a location of the user relative to multiple user devices in the environment.

Figure 3A:
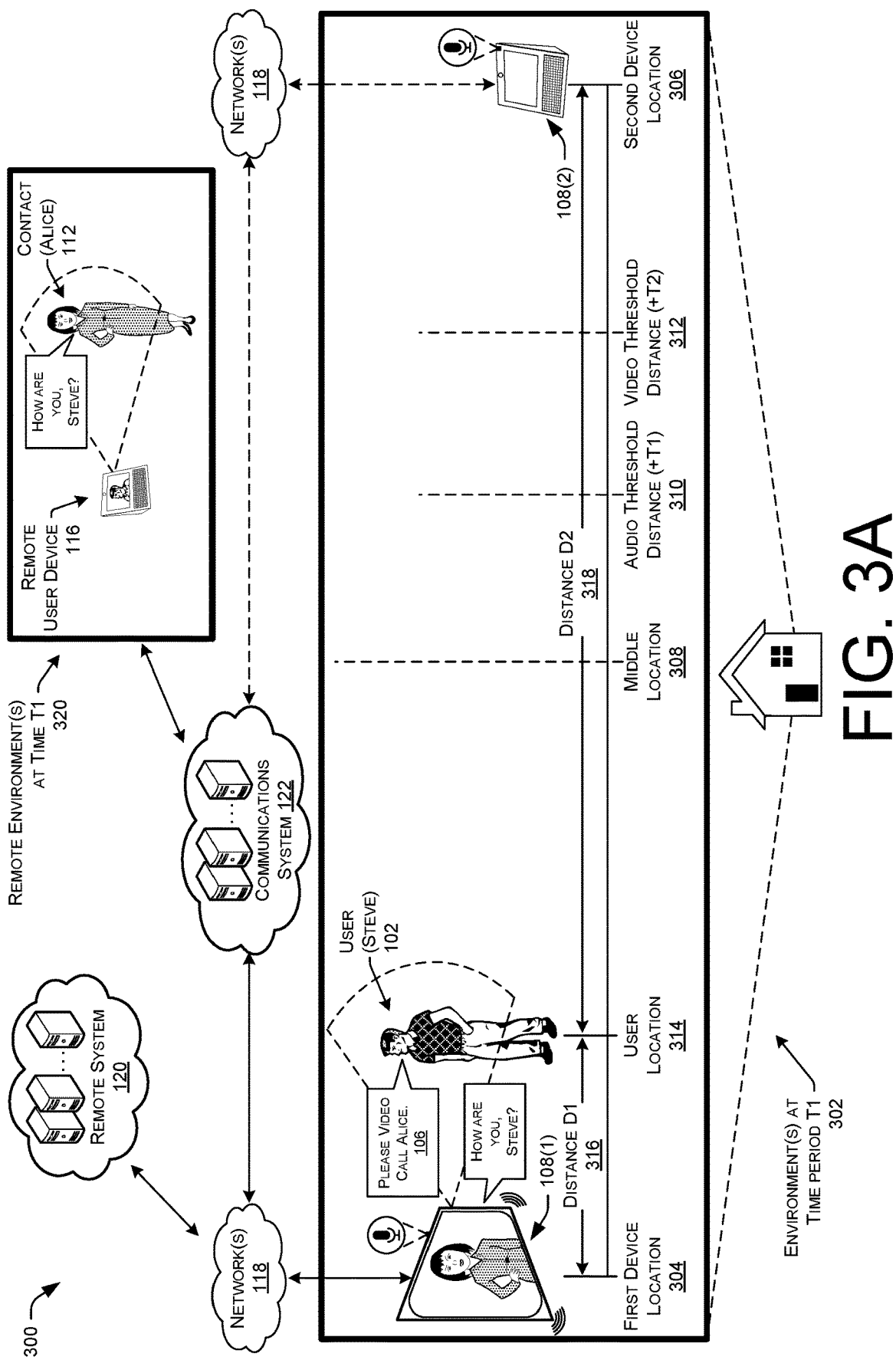
FIGS. 3A, 3B, 3C, and 3D illustrate schematic diagrams of illustrative environments through which a user moves while conducting a video call, and further illustrate a communications system transitioning the flow of data of the video call between multiple user devices based on a location of the user relative to multiple user devices in the environment.

As shown in FIG. 3A, the user 102 is located in one or more environments (e.g., one or more rooms, one or more floors in a building, etc.) at a time period T1 302, and utters a voice command 106 to "Please video call Alice." The environment(s) at the time period T1 302 may include a first user device 108(1) (or "device 108(1)") located at a first device location 304, and a second user device 108(2) (or "device 108(2)") located at a second device location 306. The device 108(1) may be positioned a distance away from the second device 108(2) in the environment(s) at time period T1 302 that has a middle location 308 between the devices 108(2) and 108(2). Further, based on various information, such as the types of devices 108, the capabilities of the devices 108, the amount or types of components of the devices 108 (e.g., microphones, cameras, speakers, etc.), the user-device transfer component 144 may define an audio threshold distance (+T1) 310 and a video threshold distance (+T2) 312 which define threshold distances that the user 102 may move past in order for the user-device transfer component 144 to transfer data flow between the device 108(1) and the device 108(2). The audio threshold distance (+T1) 310 defines the distance past which the user 102 must move from the user device 108(1) in order to have the user-device transfer component 144 transfer the flow of audio data from the user device 108(1) to the user device 108(2). Similarly, the video threshold distance (+T2) 312 defines the distance past which the user 102 must move from the user device 108(1) in order to have the user-device transfer component 144 transfer the flow of video data from the user device 108(1) to the user device 108(2). Although illustrated as being different, the audio threshold distance (+T1) 310 and the video threshold distance (+T2) 312 may be the same in some examples, and may be different values (e.g., the video threshold distance (+T2) may be less than the audio threshold distance (+T1) 310 in some examples).

As illustrated, the connection-management component 130 of the communications system 122 may have caused a first network-based connection to be initiated or established between the first device 108(1) and the remote user device 116 by which the device 108(1) and the remote user device 116 are communicating audio call data and video data. Further, the connection-management component 130 may have initiated, using the SIP for example, a second network-based connection between the second device 108(2) and the communications system 122. The user maybe positioned at user location 314, which is a distance D1 316 from the first device location 304 of the first device 108(1). In the environment(s) at time period T1 302, the user may request and conduct a video call using the first device 108(1) with the remote user device 116 of the contact "Alice" 112. Further, the user location 216 of the user 102 may be a distance D2 318 from the second device location 306. In this example, the distance D1 316 is smaller than the distance D2 318, and the communications system 122 may utilize the first device 108(1) to perform the video call.

Figure 3B:
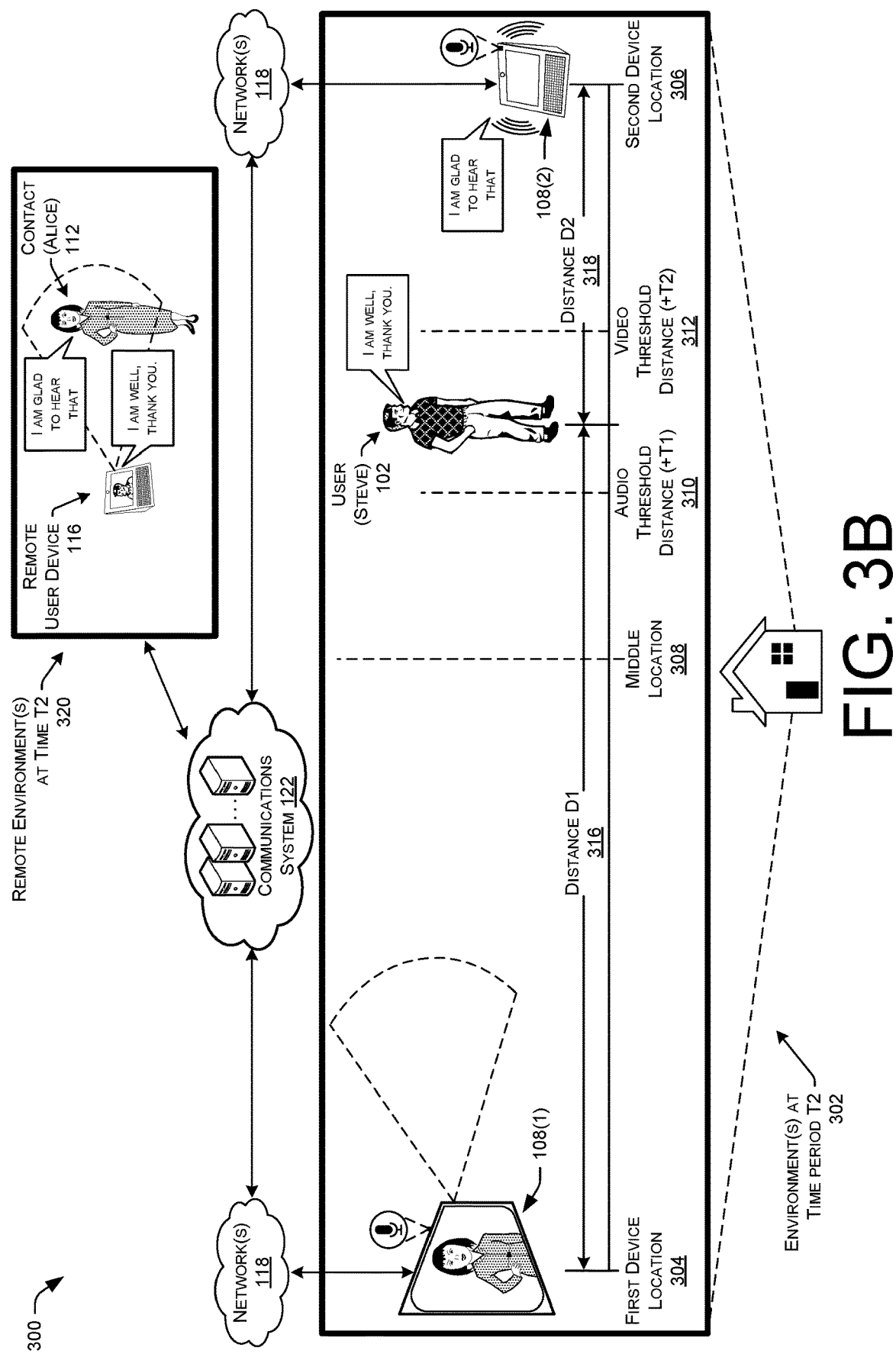

FIG. 3B illustrates the schematic diagram 300 where the user 102 has moved to a new user location 314 in the environment(s) at a time period T2 302. In some examples, because the user 102 has moved past the middle location 308 between the first device location 304 and the second device location 306, the user-device transfer component 144 may cause the connection-management component 130 to cause the audio data flow of the call to transition from the first device 108(1) to the second device 108(2). For instance, the user-location component 138 may determine that the user 102 has moved past the audio threshold distance (+T1) 310 and cause the user-device transfer component 144 to transfer the flow of audio data from the first device 108(1) to the second device 108(2). However, the user-location component 138 may determine that the user 102 has not moved past the video threshold distance (+T2) 312, and the user-device transfer component 144 may continue to cause video data to be sent to, and received from, the first device 108(1).

As illustrated in FIG. 3B, the user-device transfer component 144 may determine that, based on the user location 314, the user 102 has moved past the audio threshold distance (+T) 310 to transition the data flow of the call from the first device 108(1) to the second device 108(2). However, to prevent rapid switching of the flow of video data between the devices 108(1) and 108(2), and based on the first device 108(1) having a larger display, the user-device transfer component 144 may refrain from transitioning the video data flow of the call from the first device 108(1) to the second device 108(2). More specifically, the user-device transfer component 144 may determine that a difference between the distance D1 316 between the first device location 304 and the user location 314 and the distance D2 318 between the user location 314 and the second device location 306 is greater than or equal to the video threshold distance (+T) 312. Based on this, the user-device transfer component 144 may refrain from switching the flow of the video data from the first device 108(1) to the second device 108(2) to prevent rapid switching of the video data flow, and also to display video data on the larger display of the first device 108(1).

Figure 3C:
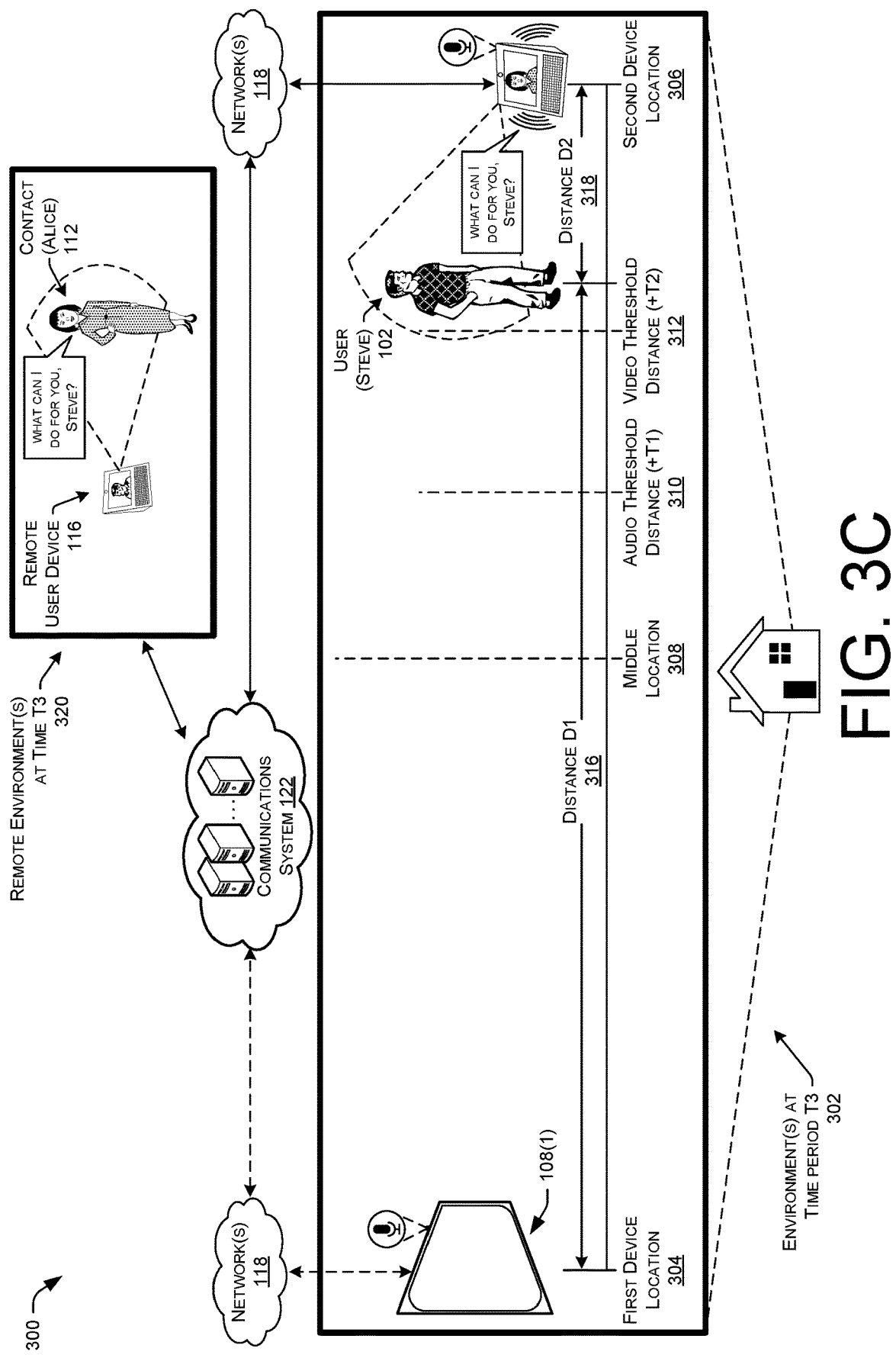

FIG. 3C illustrates the schematic diagram 300 where the user 102 has moved to a new user location 314 in the environment(s) at a time period T3 302. In some examples, because the user 102 has now moved past the video threshold distance (+T2) 312, the user-device transfer component 144 may cause the connection-management component 130 to cause the video data flow of the call to transition from the first device 108(1) to the second device 108(2). For instance, the user-device transfer component 144 may determine that the user 102 is close enough to the second device location 306 that rapid switching of the video data flow of the call between the first device 108(1) and the second device 108(2) is less likely to occur than if the user 102 had simply moved past the middle location 308. Thus, the user-device transfer component 144 may cause the connection-management component 130 to transfer the flow of data of the call to transition from the first device 108(1) to the second device 108(2) during the time period T3 because the user location 314 is past the video threshold distance (+T2) 312 from the first device location 304.

Figure 3D:
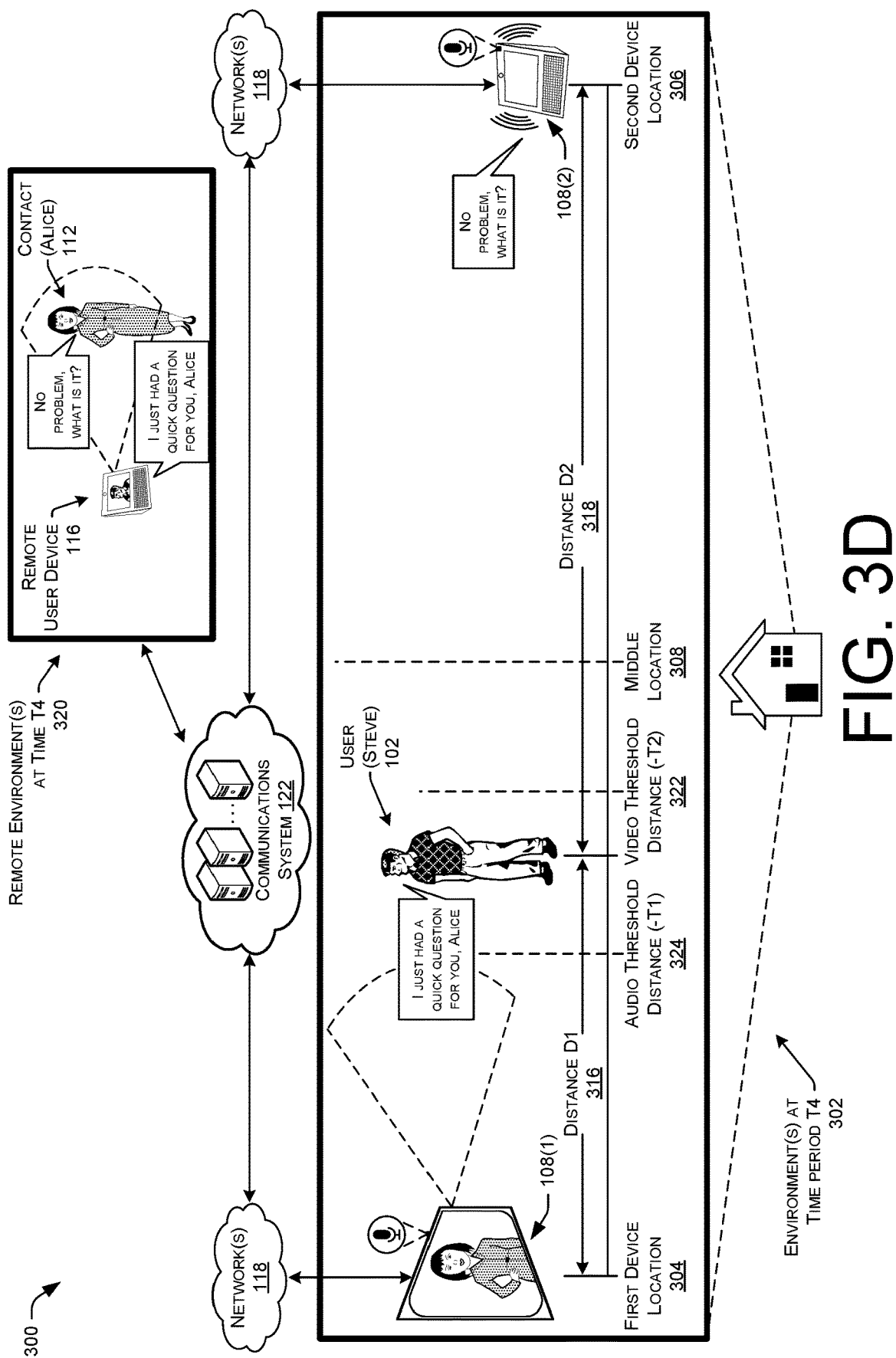

FIG. 3D illustrates the schematic diagram 300 where the user 102 has moved to a new user location 314, in the environment(s) 302 at time a time period T4. As illustrated, the user 102 has moved past a video threshold distance (−T2) 322, but not past the audio threshold distance (−T1) 324. In some examples, the video threshold distance (−T2) is closer to the middle location 308 than the video threshold distance (+T2) 312. In this way, video data is more likely to be sent and received by the first device 108(1), which may be advantageous as it has a larger display than the second device 108(2). Thus, the user-location component 138 may determine that the user 102 has moved past the video threshold distance (−T2) 322, but not past the audio threshold distance (−T1) 324. The user-location component 138 may cause the connection-management component 130 to transition the video data from the second device 108(2) to the first device 108(1). However, the connection-management component 130 may refrain from transitioning the audio data stream from the second device 108(2) to the first device 108(1) because the user 102 has not past the audio threshold distance (−T1) 324. In this way, more rapid transitioning of audio data between the user devices 108(1) and 108(2) may be prevented, and the first device 108(1) having the larger display may be more likely to have video data presented on its display.

FIGS. 1, 2A-2D, and 3A-3D illustrate examples where the user-location component 138 determines physical distances between the user 102 and the user devices 108. However, the distances and thresholds may be decoupled from physical distances. For instance, in examples where the user-location component 138 analyzes audio data received from the first device 108(1) and the second device 108(2), the user-location component 138 may determine, or receive, various audio data metrics, values, characteristics, etc. The audio data characteristics may include any type of characteristics which indicates a distance of a user 102 to a device 108, such as signal-to-noise ratios for speech of the user 102 versus background noise, energy levels representing speech of the user 102, signal amplitudes for signals representing speech of the user 102, and so forth. For example, the user-location component 138 may analyze audio data characteristics for audio data received from the first device 108(1), and also analyze audio data characteristics for audio data received from the second device 108(2), and determine to which of the devices 108(1) and 108(2) the user 102 is closer based on a comparison of those audio data characteristics. For instance, if a signal amplitude representing speech of the user 102 received from the second device 108(2) is greater than, or greater than by some threshold amount, a signal amplitude representing the speech of the user 102 received from the first device 108(1), the user-location component 138 may determine that the user 102 is closer to the second device 108(2) by some threshold amount that results in transitioning of the flow of audio data and/or video data from the first device 108(1) to the second device 108(2). Thus, as described herein, determining a "distance" may comprise determining physical distances, or be decoupled from physical distances and comprise an analysis of audio data characteristics to determine proximities.

FIG. 4 illustrates a block diagram of an example architecture of a speech processing system which receives audio data and/or addition data from voice-enabled devices, and performs techniques to determine how to respond to a voice command of a user represented in the audio data. The block diagram of FIG. 4 illustrates an example architecture of a speech processing system (e.g., remote system 120) which receives audio data 402 and additional data 404 (e.g., metadata such as timestamps, SRN values, etc.) from user devices 108, and performs techniques to determine which of the user devices is to respond to a voice command 106 of the user 102 represented in the audio data 402.

FIG. 4 includes a conceptual diagram of how a voice command 106 can be processed, allowing a system to capture and execute commands spoken by a user 102, such as spoken commands that may follow a wakeword. The various components illustrated may be located on a same or different physical devices. Communication between various components illustrated in FIG. 4 may occur directly, or across a network. An audio capture component, such as a microphone of user device 108, captures audio corresponding to a voice command 106. The user device 108, using a wakeword detection component 400, then processes the voice command 106, or audio data corresponding to the voice command 106, to determine if a keyword (such as a wakeword) is detected in the voice command 106. Following detection of a wakeword, the user device 108 sends an audio data 402 corresponding to the voice command 106, to a computing device of the remote system 120 that includes the ASR component 424. The audio data 402 may be output from an acoustic front end (AFE) 428 located on the user device 108 prior to transmission. Or, the audio data 402 may be in a different form for processing by a remote AFE 428, such as the AFE 428 located with the ASR component 424.

In various examples, the remote system 120 may include one or more processors 406 to power components, devices, and actions of the remote system 120, and one or more network interfaces 408 such as a wireless or Wi-Fi network communications interface, an Ethernet communications interface, a cellular network communications interface, a Bluetooth communications interface, etc., for communications by the remote system 120 over various types of networks (e.g., network(s) 118), including wide-area network, local-area networks, private networks, public networks etc. In the case of a wireless communications interfaces, such interfaces may include radio transceivers and associated control circuits and logic for implementing appropriate communication protocols.

The remote system 120 may further include computer-readable media 410 which stores various components, components, or other executable software to perform various arbitration actions to determine which user device 108 is to respond to a command in the voice command 106. The computer-readable media 410 may store an operating system 412 that is configured to manage hardware and services within and coupled to the remote system 120.

The computer-readable media 410 may further include an orchestration component 414, an arbitration component 416, a targeting component 418, and a user registry 420 including device indications for the devices 108 of the user 102. The arbitration component 416 may perform various functions or processes for determining a user device 108 to respond to a user 102 based on metadata 116 for user devices 108 that generated audio data 402 corresponding to a voice command 106. The targeting component 418 may perform various operations for determining which user devices 108 are to respond to a command in the voice command 106. For instance, the targeting component 418 may determine, using the user registry 420, all of the user devices 108 and/or secondary devices associated with a user and/or household account. The targeting component 418 may use the additional data 404, intent expressed in the voice command 106 determined by the NLU component 436, and devices states stored in the user registry 420 to determine which of the devices 108 should perform the command indicated in the voice command 106.

The remote system 120 may further include a speech-processing component 422, which includes various components for processing a voice command 106, such as the automatic speech recognition (ASR) component 424 and the natural language understanding (NLU) component 436. The various components illustrated may be located on a same or different physical devices.

In some examples, audio data (e.g., audio data 402) may be received by the remote system 120 for speech processing for interpretation of the included voice command 106 (either for purposes of enabling voice-communications and/or for purposes of executing a command in the speech). The audio data 402 may include data corresponding to the wakeword, or the portion of the audio data corresponding to the wakeword may be removed by the user device 108 prior to sending. Upon receipt by the remote system 120, the ASR component 424 may convert the audio data into text. The ASR component 424 transcribes audio data into text data representing the words of the speech contained in the audio data. The text data may then be used by other components for various purposes, such as arbitration, executing system commands, inputting data, etc. A voice command 106 in the audio data is input to a processor configured to perform ASR which then interprets the utterance based on the similarity between the utterance and pre-established ASR language models stored in an ASR model knowledge base (ASR Models Storage 426). For example, the ASR process may compare the input audio data with models for sounds (e.g., subword units or phonemes) and sequences of sounds to identify words that match the sequence of sounds spoken in the utterance of the audio data.

The different ways a voice command 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 432 stored in an ASR Models Storage 426), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 424 outputs the most likely text recognized in the audio data. The ASR component 424 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 428 and a speech recognition engine 430. The acoustic front end (AFE) 428 transforms the audio data from the microphone into data for processing by the speech recognition engine 430. The speech recognition engine 430 compares the speech recognition data with acoustic models 432, language models 434, and other data models and information for recognizing the speech conveyed in the audio data. The AFE 428 may reduce noise in the audio data and divide the digitized audio data into frames representing time intervals for which the AFE 428 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 428 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 430 may process the output from the AFE 428 with reference to information stored in speech/model storage (426). Alternatively, post front-end processed data (such as feature vectors) may be received by the device executing ASR processing from another source besides the internal AFE 428. For example, the user device 108 may process audio data into feature vectors (for example using an on-device AFE 428) and transmit that information to a server across a network for ASR processing. Feature vectors may arrive at the remote system 120 encoded, in which case they may be decoded prior to processing by the processor executing the speech recognition engine 430.

The speech recognition engine 430 attempts to match received feature vectors to language phonemes and words as known in the stored acoustic models 432 and language models 434. The speech recognition engine 430 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 430 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 430 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The NLU component 436 (e.g., server) may include various components, including potentially dedicated processor(s), memory, storage, etc. As shown in FIG. 4, the NLU component 436 may include a recognizer 442 that includes a named entity recognition (NER) component 440 which is used to identify portions of query text that correspond to a named entity that may be recognizable by the system. A downstream process called named entity resolution links a text portion to a specific entity known to the system. To perform named entity resolution, the system may utilize gazetteer information 452 stored in entity library storage 454. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 436 takes textual input (such as the textual input determined by the ASR component 424) and attempts to make a semantic interpretation of the text. That is, the NLU component 436 determines the meaning behind the text based on the individual words and then implements that meaning. NLU component 436 interprets a text string to derive an intent or a desired action from the user as well as the pertinent pieces of information in the text that allow a device (e.g., user device 108) to complete that action. For example, if a spoken utterance is processed using ASR component 424 and outputs the text "turn off the alarm" the NLU component 436 may determine that the user 102 intended that the user device 108(2) be instructed to turn off an alarm sound being output. As another example, if the spoken utterance is processed using ASR component 424 and outputs the text "hang up the phone" the NLU component 436 may determine that the user 102 intended that the user device 108(2) be instructed to hang up a phone through which a phone call is being performed.

The NLU component 436 may process several textual inputs related to the same utterance. For example, if the ASR component 424 outputs N text segments (as part of an N-best list), the NLU component 436 may process all N outputs to obtain NLU results.

To correctly perform NLU processing of speech input, the NLU component 436 may be configured to determine a "domain" of the utterance so as to determine and narrow down which services offered by the endpoint device (e.g., remote system 120 or the user device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 440 receives a query in the form of ASR results and attempts to identify relevant grammars and lexical information that may be used to construe meaning. To do so, the NLU component 436 may begin by identifying potential domains that may relate to the received query. The NLU storage 438 includes a database of devices domains 444 which identify domains associated with specific devices. For example, the user device 108 may be associated with domains for music, telephony, calendaring, contact lists, and device-specific communications, but not video. In addition, the device domains 444 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 442, language model and/or grammar databases 446, a particular set of domain intents/actions 448, and a particular personalized domain lexicon 450. Each gazetteer 452 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 456 parses the query to determine an intent or intents for each identified domain, where the intent corresponds to the action to be performed that is responsive to the query. Each domain is associated with a database (e.g., domain intents 448) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 456 identifies potential intents for each identified domain by comparing words in the query to the words and phrases in the domain intents database 448. In some instances, the determination of an intent by the IC component 456 is performed using a set of rules or templates that are processed against the incoming text to identify a matching intent.

In order to generate a particular interpreted response, the NER 440 applies the grammar models and lexical information associated with the respective domain to actually recognize a mention one or more entities in the text of the query. In this manner, the NER component 440 identifies "slots" (i.e., particular words in query text) that may be needed for later command processing. Depending on the complexity of the NER component 440, it may also label each slot with a type of varying levels of specificity (such as noun, place, city, artist name, song name, or the like). Each grammar model 446 includes the names of entities (i.e., nouns) commonly found in speech about the particular domain (i.e., generic terms), whereas the lexical information 450 from the gazetteer 452 is personalized to the user(s) and/or the device. For instance, a grammar model associated with the shopping domain may include a database of words commonly used when people discuss shopping.

The intents identified by the IC component 456 are linked to domain-specific grammar frameworks (included in 446) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (446) framework or frameworks may correspond to sentence structures such as "Send a message to {contact}," "Send a voice message to {contact}," "Send the following to {contact}," etc.

For example, the NER component 440 may parse the query to identify words as subject, object, verb, preposition, etc., based on grammar rules and/or models, prior to recognizing named entities. The identified verb may be used by the IC component 456 to identify intent, which is then used by the NER component 440 to identify frameworks. A framework for the intent of "send a message," meanwhile, may specify a list of slots/fields applicable to play the identified "contact" and any object modifier (e.g., specifying a device of the recipient) or the like. The NER component 440 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 440 may search the database of generic words associated with the domain (in the knowledge base 458). So, for instance, if the query was "send message to Joe," after failing to determine a last name for "Joe," the NER component 440 may search the domain vocabulary for the word "Joe." In the alternative, generic words may be checked before the gazetteer information, or both may be tried, potentially producing two different results.

The output data from the NLU component 436 (which may include tagged text, commands, etc.) may then be sent to the command-processing component 460. The destination command-processing component 460 may be determined based on the NLU output. For example, if the NLU output includes a command to send a message, the command-processing component 460 may be a message sending application, such as one located on the user device or in a message sending appliance, configured to execute a message sending command. If the NLU output includes a search request, the destination command processor 146 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 436 during runtime operations where NLU operations are performed on text (such as text output from an ASR component 428). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 442. Each recognizer may include various NLU components such as an NER component 440, IC component 456 and other components such as an entity resolver, or other components.

As noted above, multiple devices may be employed in a single remote system 120. In such a multi-device system, each of the devices may include different components for performing different aspects of the speech processing. The multiple devices may include overlapping components. The components of the user device 108 and the remote system 120, as illustrated herein are exemplary, and may be located in a stand-alone device or may be included, in whole or in part, as a component of a larger device or system, may be distributed across a network or multiple devices connected by a network, etc.

FIG. 4 further illustrates that the command-processing component 460 is configured to generate a command that the selected user device 108 uses to respond to the voice command 106. As illustrated in FIG. 4, the remote system 120, including the orchestration component 414, the ASR component 424, and the NLU component 436, may be coupled to the targeting component 418 and provide the targeting component 418 with the intent determined to be expressed in the voice command 106. Further, the arbitration component 416 may provide device indicators (e.g., IP addresses, devices names, etc.) for one or more of the user devices 108. The targeting component 418 may then perform techniques to determine a target device (e.g., a device to perform the requested operation), and provide various data to the command-processing component 460. For instance, the targeting component 418 may provide the command-processing component 460 with various device identifiers of the user devices 108, the determined target device, the determined intent and/or command, etc.

The command-processing component 460 and/or NLU component 436 may determine a domain based on the intent and, based on this determination, route the request corresponding to the audio data to the appropriate domain speechlet, such as the illustrated domain speechlets 462. The domain speechlets 462 may comprise any type of device or group of devices (e.g., hardware device, virtual devices or partitions, server, etc.), and may receive the text data and/or an intent associated with the audio data 402 and determines how to respond to the request. For instance, the intent for a command "please hang up my phone call" may be routed to a smart home domain speechlet 462 which controls devices connected to the user devices 108, such as a phone through which a phone call is being conducted. The smart home domain speechlet 462 may determine a command to generate based on the intent of the user 102 to hang up a phone call. Additionally, the smart home domain speechlet 462 may determine additional content, such as audio data, to be output by one of the user devices 108(1) or 108(2), such as "we have hung up your phone call."

Various types of domain speechlets 462 may be used to determine which devices 108 to use to respond to a voice command 106, as well as the appropriate response and potential additional content (e.g., audio data). For example, the domain speechlets 462 may include a third party skills domain speechlet 462 which may handle intents associated with gaming, productivity, etc., a music domain speechlet 462 which may handle intents associated with music play requests (e.g., Amazon Music, Pandora, Spotify, iHeart, etc.), a video domain speechlet 462 which may handle intents associated with video play requests (e.g., Amazon Video, HBO, Netflix, Hulu, etc.), a household organization domain speechlet 462 which may handle intents associated with household activities (e.g., calendars, reminders, timers, etc.), a smart home domain speechlet 462 which may handle intents associated with controlling smart devices (e.g., controlling lights, door locks, home monitoring, etc.), an automotive domain speechlet 462, a shopping domain speechlet 462 which may handle shopping requests (e.g., making a shopping list, ordering items online, etc.), and/or a weather domain speechlet 462 which may handle requests for weather forecasts (e.g., providing a URL to a weather website, providing weather related images and/or videos, etc.).

After the domain speechlet 462 generates the appropriate command based on the intent of the user 102, and/or provides additional content, such as audio data, to be output by one of the user devices 108 (e.g., "we have hung up your phone call"), the domain speechlet 462 may provide this information back to the speech system 120, which in turns provides some or all of this information to a text-to-speech (TTS) engine 464. The TTS engine 464 then generates an actual audio file for outputting the second audio data determined by the domain speechlet 462 (e.g., "we have hung up your phone call", or "we have turned off your alarm . . . "). After generating the file (or "audio data"), the TTS engine 464 may provide this data back to the remote system 120.

The remote system 120 may then publish (i.e., write) some or all of this information to an event bus. That is, the remote system 120 may provide information regarding the initial request (e.g., the speech, the text, the domain/intent, etc.), the response to be provided to the user device 108 (e.g., the command to hang up a phone call, the command to turn off an alarm, etc.), or any other information pertinent to the interaction between the user device 108(1) and the remote system 120 to the event bus.

Within the remote system 120, one or more components or services may subscribe to the event bus so as to receive information regarding interactions between user devices and the remote system 120. For instance, a device management component may subscribe to the event bus and, thus, may monitor information regarding these interactions. In some examples, monitoring information in the event bus may comprise communications between various components of the remote system 120. For example, the targeting component 418 may monitor the event bus to identify device state data for user devices 108. In some examples, the event bus may "push" or send indications of events and/or device state data to the targeting component. Additionally, or alternatively, the event bus may be "pulled" where the targeting component 418 sends requests to the event bus to provide an indication of device state data for a user device 108. The event bus may store indications of the device states for the devices 108, such as in a database (e.g., user registry 420), and using the stored indications of the device states, send the device state data for user devices 108 to the targeting component. Thus, to identify device state data for a device 108, the targeting component 418 may send a request to the event bus (e.g., event component) to provide an indication of the device state data associated with a device 108, and receive, from the event bus, the device state data that was requested.

The device management component functions to monitor information published to the event bus and identify events that may trigger action. For instance, the device management component may identify (e.g., via filtering) those events that: (i) come from user devices 108, and (ii) are associated with supplemental content (e.g., image data, video data, etc.). The device management component may reference the user registry 420 to determine which user devices 108 are associated with secondary devices, as well as determine device types, states, and other capabilities of these secondary devices. For instance, the device management component may determine, from the information published to the event bus, an identifier associated with the user device 108 making the corresponding request or the user device 108 selected to respond to the voice command 106. The device management component may use this identifier to identify, from the user registry 420, a user account associated with the user device 108. The device management component may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The computer-readable media 410 may further include the user registry 420 that includes data regarding user profiles as described herein. The user registry 420 may be located part of, or proximate to, the remote system 120, or may otherwise be in communication with various components, for example over a network. The user registry 420 may include a variety of information related to individual users, accounts, etc. that interact with the user devices 108, and the remote system 120. For illustration, the user registry 420 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 420 may store indications of associations between various user devices 108 and/or secondary device, such as virtual clusters of devices. The user registry 420 may represent clusters of devices 108 as single devices that can receive commands and disperse the commands to each device 108 in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as user devices 108(1) and 108(2). In this way, the command-processing component 460 and/or the domain speechlets 462 may determine, based on the stored device states in the user registry 420, a current device state of the user devices 108. Rather than receiving device states for the user devices 108, in additional data 404, the devices states may already have been determined or received and stored in the user registry 420. Further, the user registry 420 may provide indications of various permission levels depending on the user. As an example, the remote system 120 may perform speaker recognition on the audio data 402 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus may publish different events which indicate device states to various entities or components that subscribe to the event bus. For instance, if an event of "set an alarm" occurs for a user device 108, the event bus may publish the indication of this event, and thus the device state of an alarm is set for the user device 108. Thus, various components, such as the targeting component 418, may be provided with indications of the various device states via the event bus. The event bus may further store and/or update device states for the user devices 108 in the user registry 420. The components of the remote system 120 may query the user registry 420 to determine device states.

A particular user profile may include a variety of data that may be used by the system 120. For example, a user profile may include information about what user device 108 are associated with the user 102. The user profile may further indicate an IP address for each of the devices associated with the user 102, user IDs for each of the devices, indicates of the types of devices, and current device states for the devices.

The computer-readable media 410 may further store a dialog management component 466 that is responsible for conducting speech dialogs with the user 102 in response to meanings or intents of user speech determined by the NLU component 436. The dialog management component 408 may include domain logic that is used to analyze the meaning of user speech and to determine how to respond to the user speech. The dialog management component 466 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

Figure 5A:
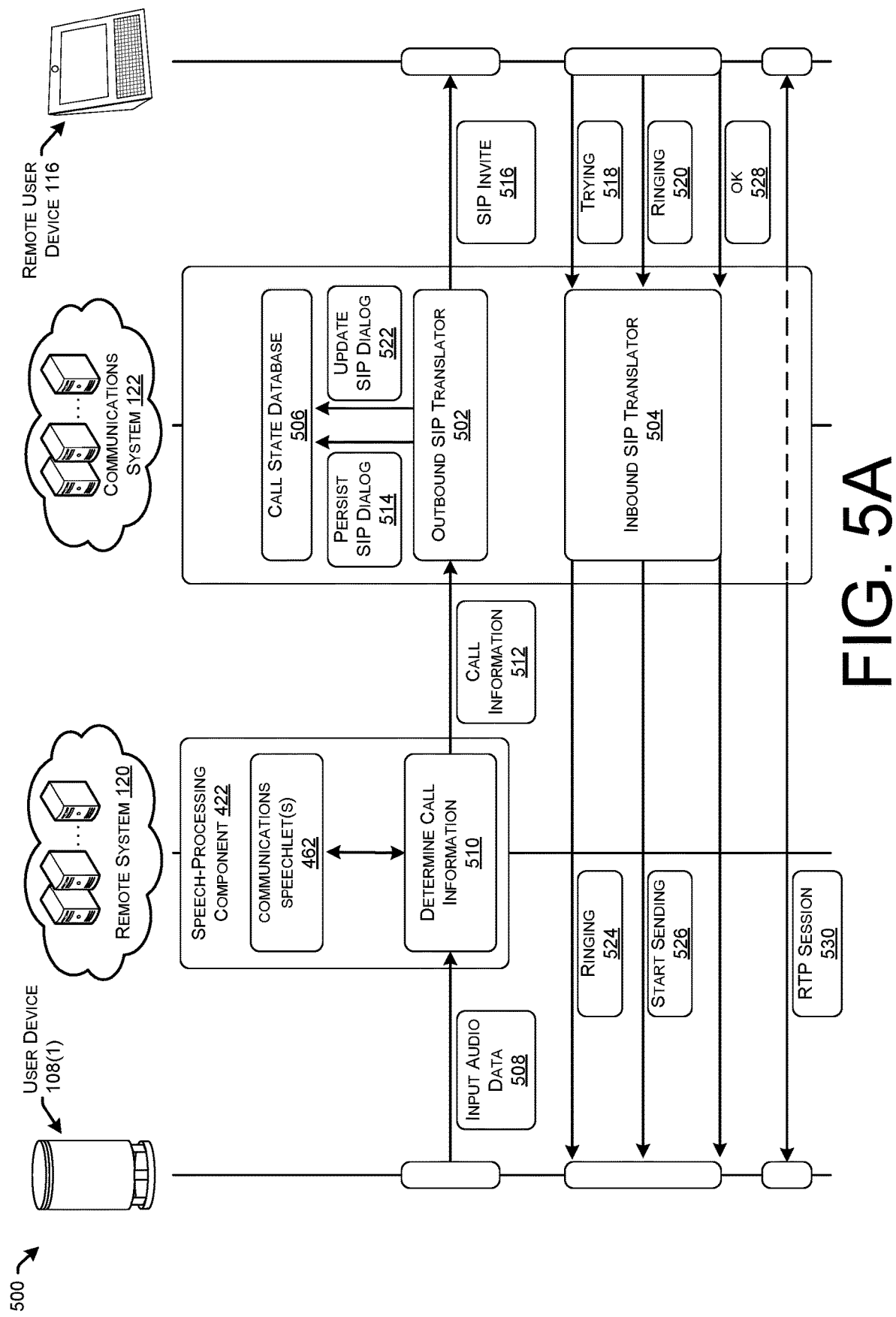
FIGS. 5A and 5B illustrate example techniques for a communications system to establish a flow of data between devices, and transitioning the flow of data to a different device.
Figure 5B:
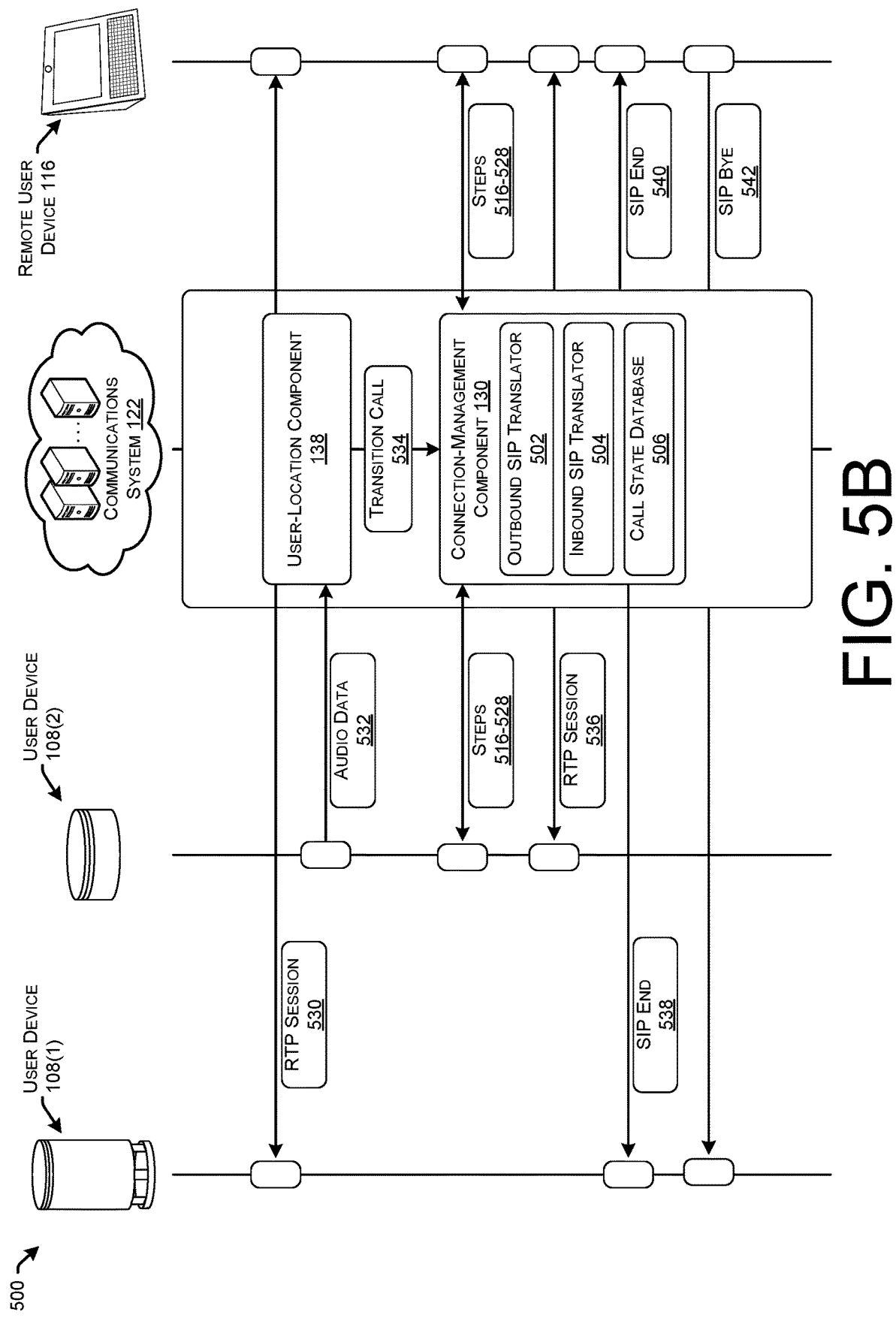

FIGS. 5A and 5B illustrate example techniques for establishing a flow of data between devices, and transitioning the flow of data to a different device. For example, the communications system 122 may transition the flow of data between the user device 108(1) and remote user device 116 to the user device 108(2) and the remote user device 116.

FIGS. 5A and 5B illustrate components that can be used to coordinate communications using a system, such as the communications system 122. The components shown in FIG. 5A carry out an example process 500 of signaling to initiate a communication session according to the present disclosure. In one example configuration, the remote system 120 is configured to enable voice commands (e.g., perform ASR, NLU, etc. to identify a voice command included in audio data), whereas the communications system 122 is configured to enable communication sessions (e.g., using session initiation protocol (SIP)). For example, the communications system 122 may send SIP messages to endpoints (e.g., recipient devices such as user device 108(1) and remote user device 116) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the communications system 122 may send SIP messages to initiate a single RTP media stream between two endpoints (e.g., direct RTP media stream between the user device 108(1) and a remote user device 116) and/or to initiate and facilitate RTP media streams between the two endpoints (e.g., RTP media streams between the user device 108(1) and the communications system 122 and between the communications system 122 and the remote user device 116). During a communication session, the communications system 122 may initiate two media streams, with a first media stream corresponding to incoming audio data from the user device 108(1) to the remote user device 116 and a second media stream corresponding to outgoing audio data from the remote user device 116 to the user device 108(1), although for ease of explanation this may be illustrated as a single RTP media stream.

As illustrated in FIG. 5A, the communications system 122 may include components to coordinate communications between devices, such as an outbound SIP translator, an inbound SIP translator, and a call state database 506. As shown, the user device 108(1) may send (508) input audio data 402 to the remote system 120, and the remote system 120 may determine (510) call information using the input audio data 402. For example, one or more communications speechlets 462 may receive an intent from the NLU component 436, and in response to an intent to perform a call, the communications speechlet(s) 462 may engage the communications system 122, which may perform messaging and two-way communications as described herein below. The communications speechlet(s) 462 may include hardware, software, firmware, or the like that may be dedicated to the for determining communication commands. The speechlet component may be part of the remote system 120 (for example as speechlet 490) or may be located at whole (or in part) with separate speechlet server(s). The communications speechlet(s) 462 may be configured to perform one or more actions. An ability to perform such an action may sometimes be referred to as a "skill." That is, a skill of the communications speechlet(s) 462 may configure the communications speechlet(s) 462 to execute specific functionality in order to provide data or produce some other output requested by a user. The communications speechlet(s) 462 may be configured to execute at least one skill/action, such as causing the communications system 122 to establish and maintain a call between devices.

The remote system 120 may send (512) the call information to the communications system 122 (e.g., via the communications speechlet(s) 462). The remote system 120 may determine the call information by performing ASR, NLU, etc., as discussed herein, and the call information may include a data source name (DSN), a number from which to call, a number to which to call, encodings, and/or additional information. For example, the remote system 120 may identify from which phone number the user 102 would like to initiate the call, to which phone number the user 102 would like to initiate the call, from which device 108 the user 102 would like to perform the call, etc.

While FIG. 5A illustrates the remote system 120 sending the call information to the communications system 122 in a single step (e.g., 512), the disclosure is not limited thereto. Instead, the remote system 120 may send the call information to the user device 108(1) and the user device 108(1) may send the call information to the communications system 122 in order to initiate the call without departing from the disclosure. Thus, the remote system 120 may not communicate directly with the communications system 122 in step 512, but may instead instruct the user device 108(1) to connect to the communications system 122 in order to initiate the call.

The communications system 122 may include the outbound SIP translator 502, the inbound SIP translator 504, and the call state database 506. The outbound SIP translator 502 may include logic to convert commands received from the remote system 120 into SIP requests/responses and may handle sending outgoing SIP requests and sending responses to incoming SIP requests. After receiving the call information, the outbound SIP translator 502 may persist (514) a SIP dialog using the call state database 506. For example, the DSN may include information such as the name, location, and driver associated with the call state database 506 (and, in some examples, a user ID and password of the user 102) and the outbound SIP translator 502 may send a SIP dialog to the call state database 506 regarding the communication session. The call state database 506 may persist the call state if provided a device ID and one of a call ID or a dialog ID. The outbound SIP translator 502 may send (516) a SIP Invite to a SIP Endpoint (e.g., remote user device 116, a recipient device, a Session Border Controller (SBC), or the like).

The inbound SIP translator 504 may include logic to convert SIP requests/responses into commands to send to the devices 108(1) and/or 116 and may handle receiving incoming SIP requests and incoming SIP responses. The remote user device 116 may send (518) a TRYING message to the inbound SIP translator 504 and may send (520) a RINGING message to the inbound SIP translator 534. The inbound SIP translator 534 may update (522) the SIP dialog using the call state database 506 and may send (524) a RINGING message to the user device 108(1).

When the communication session is accepted by the remote user device 116, the remote user device 116 may send (528) an OK message to the inbound SIP translator 504, the inbound SIP translator 504 may send (526) a startSending message to the user device 108(1). The startSending message may include information associated with an internet protocol (IP) address, a port, encoding, or the like required to initiate the communication session. Using the startSending message, the user device 108(1) may establish (530) an RTP communication session with the remote user device 116 via the communications system 122. In some examples, the communications system 120 may communicate with the user device 108(1) using the remote system 120 as an intermediary server.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

FIG. 5B illustrates examples of signaling to end a communication session according to the present disclosure. After establishing the RTP communication session 530 between the user device 108(1) and the remote user device 116, the user device 108(2) may send (532) audio data (and/or other data to determine proximity of the user 102) to the communications system 122. The user-location component 138 may determine to transition the call (534) from the user device 108(1) to the user device 108(2). The connection-management component 130 may then perform one or more of steps 516-528 with the user device 108(2) and the remote user device 116 to establish an RTP session (536) between the user device 108(2) and the remote user device 116. In some examples, the connection-management component 130 may transition some, or all, or the data being transmitted in the call from the device 108(1) to the device 108(2). For instance, the user device 108(1) may still receive audio data and/or video data from the remote user device 116, may still send audio data and/or video data to the remote user device 116, or may quit communicating with the remote user device 116 altogether.

In examples where the connection-management component 130 transitions all of the data being communicated to the user device 108(2), the RTP communication session (530) may be ended by the connection-management component 130. The communications system 122 may send (540) an SIP end message to the remote user device 116, and also send (538) an SIP end message to the user device 108(1). The outbound SIP translator 502 may update the session using the call state database 506 and may send (542) a SIP BYE message to the remote user device 116. The remote user device may send an OK message to the inbound SIP translator 504 and the inbound SIP translator 504 may update the session using the call state database 506. In some examples, the inbound SIP translator 504 may send the OK message to the user device 108(1) to confirm that the communication session has been ended. Thus, the RTP communication session 530 may be ended between the user device 108(1) and the remote user device 116.

Although not illustrated, the remote user device 116 may send a SIP BYE message to the inbound SIP translator 504 and the inbound SIP translator 504 may update the session using the call state database 506. The inbound SIP translator 504 may send a stopSending message to the user device 108(1). The user device 108(1) may send an End message to the outbound SIP translator 502, the End message including a DSN. The outbound SIP translator 502 may then update the session using the call state database 506, and send a 200 OK message to the remote user device 116. Thus, the RTP communication session 530 may be ended between the user device 108(1) and the remote user device 116.

While FIGS. 5A and 5B illustrate the RTP communication sessions 530 and 538 being established between the user device 108 and the remote user device 116, the disclosure is not limited thereto and the RTP communication sessions 530 and 538 may be established between the user devices 108 and a telephone network associated with the remote user device 116 without departing from the disclosure.

FIGS. 6A and 6B illustrate example components for establishing a flow of data between devices. For instances, FIGS. 6A and 6B illustrates examples 600 and 608 of establishing media streams between devices according to the present disclosure. In some examples, the user device 108(1) may have a publicly accessible IP address and may be configured to establish the RTP communication session directly with the remote user device 116. To enable the user device 108(1) to establish the RTP communication session, the communications system 122 may include Session Traversal of User Datagram Protocol (UDP) Through Network Address Translators (NATs) server(s) (e.g., STUN server(s) 602). The STUN server(s) 602 may be configured to allow NAT clients (e.g., a user device 108(1) behind a firewall) to setup calls to a VoIP provider hosted outside of the local network by providing a public IP address, the type of NAT they are behind, and a port identifier associated by the NAT with a particular local port. As illustrated in FIG. 6A, the user device 108(1) may perform (604) IP discovery using the STUN server(s) 602 and may use this information to set up an RTP communication session 606 (e.g., UDP communication) between the user device 108(1) and the remote user device 116 to establish a call.

In some examples, the user device 108(1) may not have a publicly accessible IP address. For example, in some types of NAT the user device 108(1) cannot route outside of the local network. To enable the user device 108(1) to establish an RTP communication session, the communications system 122 may include Traversal Using relays around NAT (TURN) server(s) 610. The TURN server(s) 610 may be configured to connect the user device 108(1) to the remote user device 116 when the user device 108(1) is behind a NAT. As illustrated in FIG. 6B, the user device 108(1) may establish (612) an RTP session with the TURN server(s) 610 and the TURN server(s) 610 may establish (614) an RTP session with the remote user device 116. Thus, the user device 108(1) may communicate with the remote user device 116 via the TURN server(s) 610. For example, the user device 108(1) may send outgoing audio data to the communications system 122 and the communications system 122 may send the outgoing audio data to the remote user device 116. Similarly, the remote user device 116 may send incoming audio/video data to the communications system 122 and the communications system 122 may send the incoming data to the user device 108(1).

In some examples, the communications system 122 may establish communication sessions using a combination of the STUN server(s) 602 and the TURN server(s) 610. For example, a communication session may be more easily established/configured using the TURN server(s) 610, but may benefit from latency improvements using the STUN server(s) 602. Thus, the system may use the STUN server(s) 602 when the communication session may be routed directly between two devices and may use the TURN server(s) 610 for all other communication sessions. Additionally, or alternatively, the system may use the STUN server(s) 602 and/or the TURN server(s) 610 selectively based on the communication session being established. For example, the system may use the STUN server(s) 602 when establishing a communication session between two devices (e.g., point-to-point) within a single network (e.g., corporate LAN and/or WLAN), but may use the TURN server(s) 610 when establishing a communication session between two devices on separate networks and/or three or more devices regardless of network(s). When the communication session goes from only two devices to three or more devices, the system may need to transition from the STUN server(s) 602 to the TURN server(s) 610. Thus, if the system anticipates three or more devices being included in the communication session, the communication session may be performed using the TURN server(s) 610.

Figure 7:
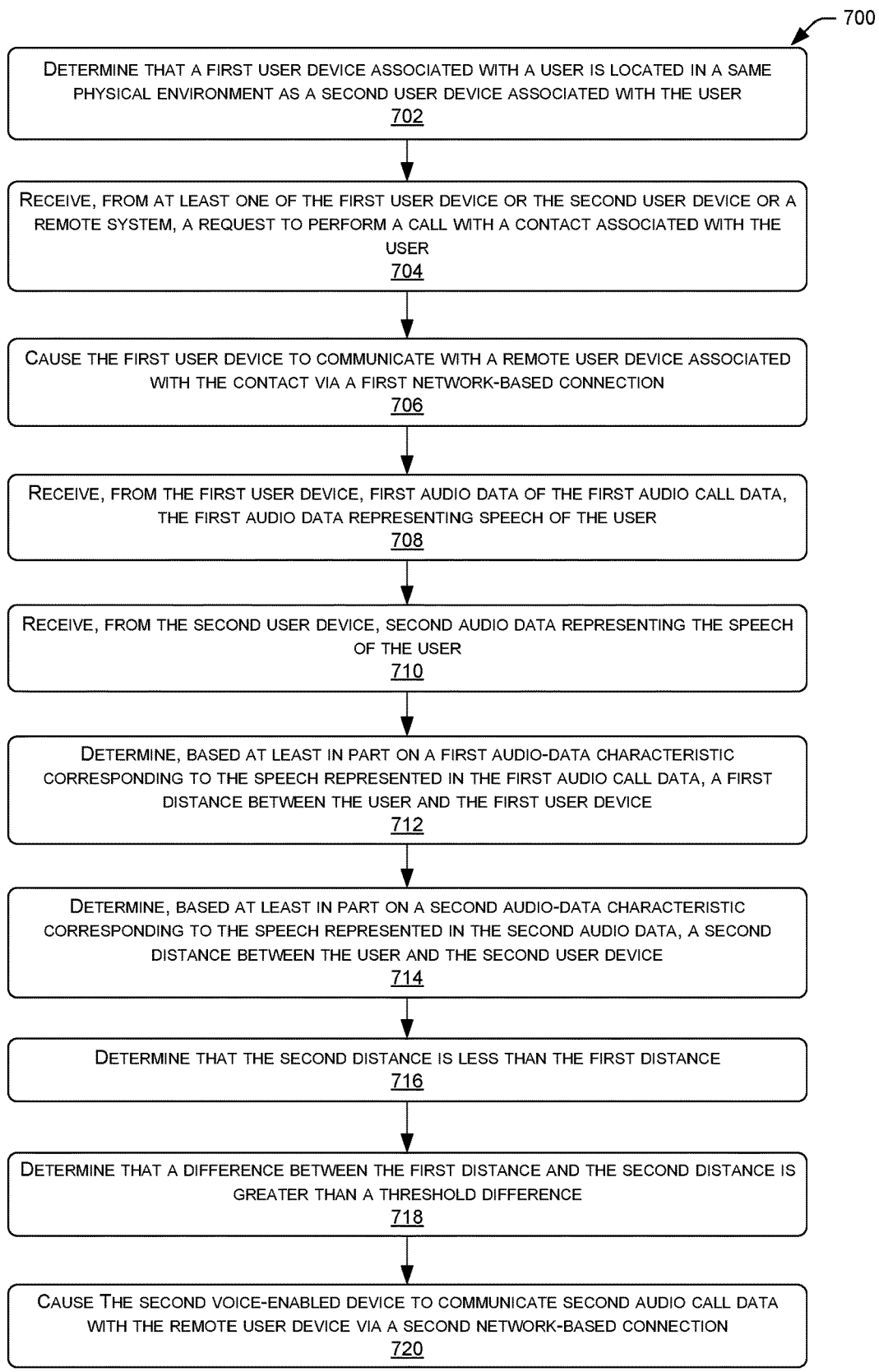
FIG. 7 illustrates a flow diagram of an example method for determining to transition a flow of data from a first user device to a second user device based at least in part on distances between the user and each of the user devices.
Figure 8:
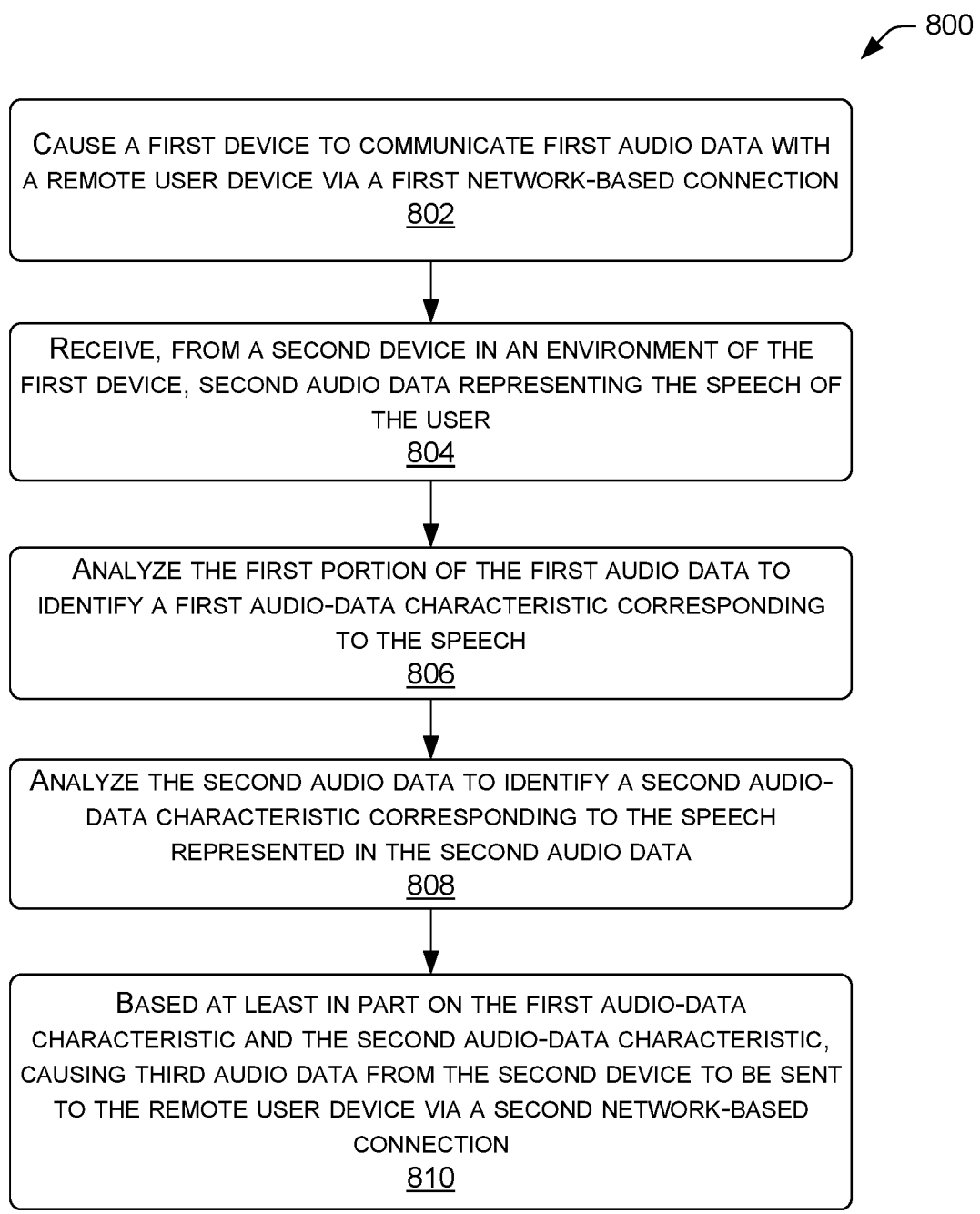
FIG. 8 illustrates a flow diagram of another example method for determining to transition a flow of data from a first device to a second device based at least in part on distances between the user and each of the user devices.
Figure 9:
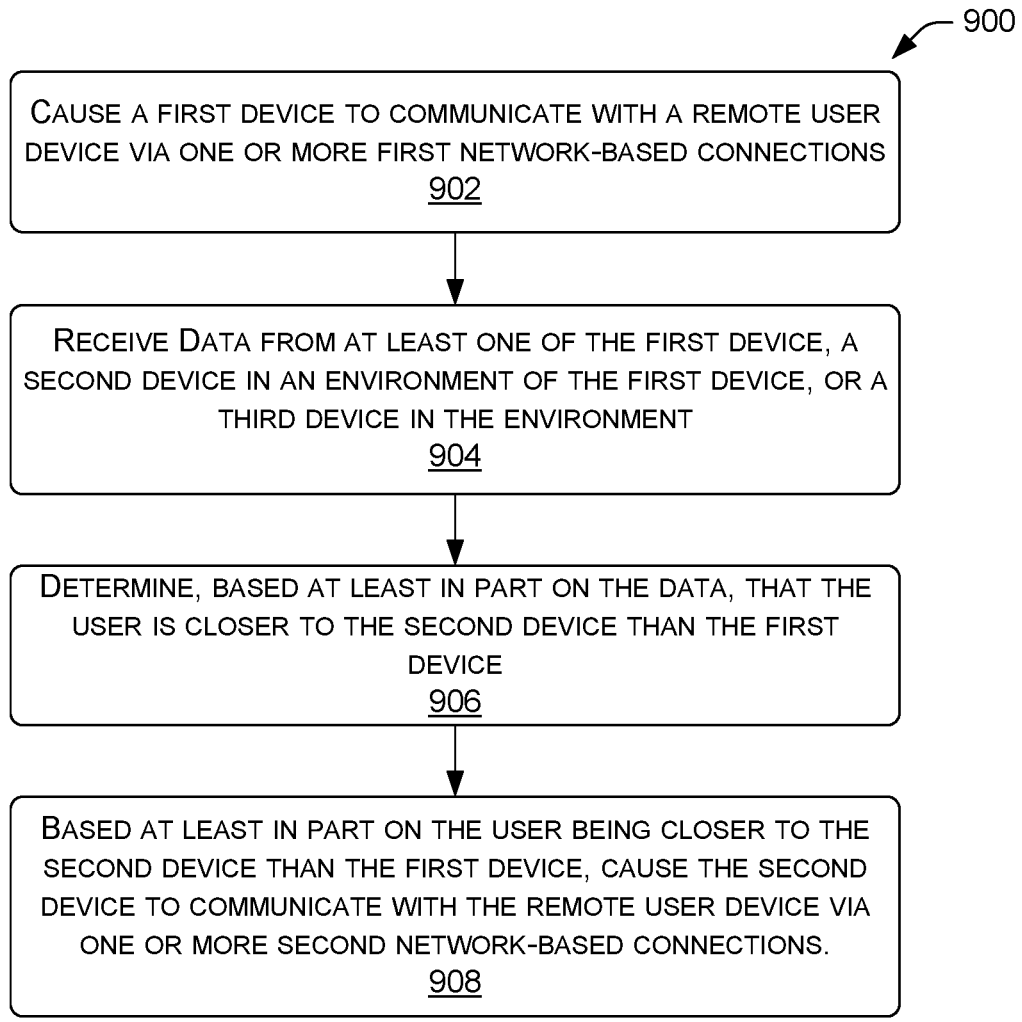
FIG. 9 illustrates another flow diagram of another example method for determining to transition a flow of data from a first device to a second device based at least in part on distances between the user and each of the user devices.

FIGS. 7, 8, and 9 illustrate flow diagrams of example methods 700, 800, and 900 for determining to transition a flow of data from a first user device 108(1) to a second user device 108(2) based at least in part on distances or proximities between the user 102 and each of the user devices 108. These methods are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 illustrates a flow diagram of an example method 700 for determining to transition a flow of data from a first user device to a second user device based at least in part on distances between the user and each of the user devices.

At 702, a communications system 122 may determining that a first user device associated with a user is located in a same physical environment as a second user device associated with the user.

At 704, the communications system 122 may receive, from at least one of the first user device or the second user device, a request to perform a call with a contact associated with the user.

At 706, the communications system 122 may cause the first user device to communicate with a remote user device associated with the contact via a first network-based connection, wherein the first network-based connection is configured to communicate first audio call data between the first user device and the remote user device.

At 708, the communications system 122 may receive, from the first user device, first audio data of the first audio call data, the first audio data representing speech of the user. At 710, the remote system 120 may receive, from the second user device, second audio data representing the speech of the user.

At 712, the communications system 122 may determine, based at least in part on a first audio-data characteristic corresponding to the speech represented in the first audio data, a first distance between the user and the first user device.

At 714, the communications system 122 may determine, based at least in part on a second audio-data characteristic corresponding to the speech represented in the second audio data, a second distance between the user and the second user device. At 716, the remote system 120 may determine that the second distance is less than the first distance.

At 718, the communications system 122 may, based at least in part on the second distance being less than the first distance, determining that a difference between the first distance and the second distance is greater than or equal to a threshold difference.

At 720, the communications system 122 may, based at least in part on the difference between the first distance and the second distance being greater than the threshold difference, causing the second user device to communicate second audio call data with the remote user device via a second network-based connection.

In some examples, the "distances" of methods 700 may comprise physical distances (e.g., feet, yards, etc.). In other examples, the distances of method 700 may be decoupled from physical distances, but rather correspond to proximities determined based on audio characteristics of the audio data, such as a signal-to-noise ratio (SNR) value corresponding to the speech represented in audio data, an amplitude measurement of an audio signal corresponding to the speech represented in the audio data, or a measurement of signal energy in a frequency range corresponding to the speech represented in the audio data. If second audio data has audio data characteristics that represent the speech of the user more strongly than first audio data characteristics of speech represented in the first audio data, then it may be determined that the user is closer to the second device which detects the user more strongly.

FIG. 8 illustrates a flow diagram of another example method 800 for determining to transition a flow of data from a first device to a second device based at least in part on distances between the user and each of the user devices.

At 802, a communications system 122 may cause, by one or more network-based devices, a first device to communicate first audio data with a remote user device via a first network-based connection. In some examples, the first device detects speech of a user in an environment of the first device and sends a first portion of the first audio data representing the speech to the remote user device via the first network-based connection and receives a second portion of the first audio data from the remote user device via the first network-based connection.

At 804, the communications system 122 may receive, from a second device in the environment of the first device, and at the one or more network-based devices, second audio data representing the speech of the user. At 806, the communications system 122 may analyze the first portion of the first audio data to identify a first audio-data characteristic corresponding to the speech.

At 808, the communications system 122 may analyze the second audio data to identify a second audio-data characteristic corresponding to the speech represented in the second audio data.

At 810, the communications system 122 may, based at least in part on the first audio-data characteristic and the second audio-data characteristic, cause third audio data from the second device to be sent to the remote user device via a second network-based connection.

FIG. 9 illustrates another flow diagram of another example method 900 for determining to transition a flow of data from a first device to a second device based at least in part on distances between the user and each of the user devices.

At 902, a communications system 122 may cause a first device to communicate with a remote user device via one or more first network-based connections. In some examples, the first device sends first audio call data representing first speech of a user to the remote user device and receives second audio call data from the remote user device.

At 904, the remote system 120 may receive data from at least one of the first device, a second device in an environment of the first device, or a third device in the environment.

At 906, the communications system 122 may determine, based at least in part on the data, that the user is closer to the second device than the first device.

At 908, the communications system 122 may, based at least in part on the user being closer to the second device than the first device, cause the second device to communicate with the remote user device via one or more second network-based connections.

Figure 10:
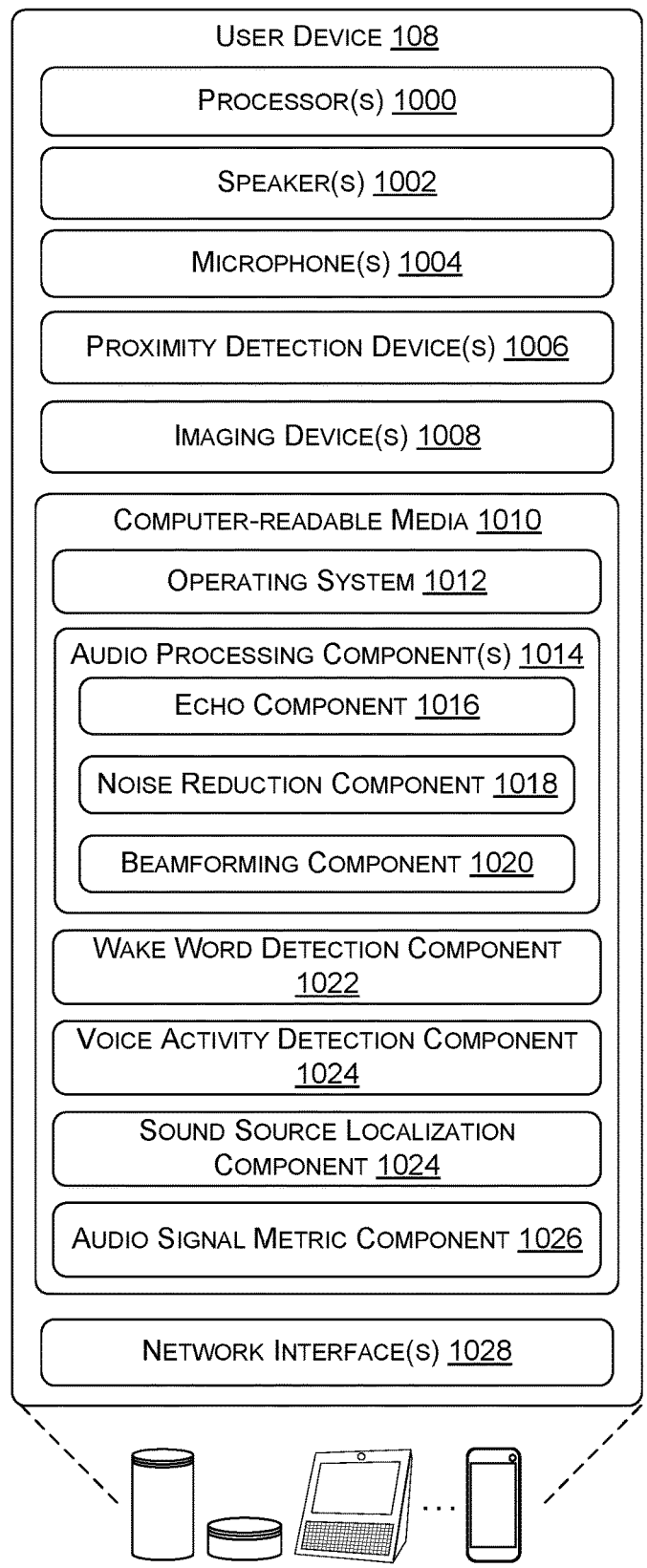
FIG. 10 illustrates a block diagram of an example architecture of a user device that generates audio data and/or additional data, and sends the audio data and/or additional data to a communications system.

FIG. 10 illustrates a block diagram of an example architecture of a user device 108 that generates audio data and/or additional data, and sends the audio data and/or additional data to a remote system 120.

The user device 108 includes one or more processors 1000, one or more speakers 802, and one or more microphones 1004. The processors 1000 may include a central processing unit (CPU), a graphics processing unit (GPU), a microprocessor, a digital signal processor, and so on. Although not illustrated, the user device 108 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the user device 108 may be used to receive input from a user and/or to output a response.

Although the user device 108 is illustrated as having one or more integral speakers 1002, in other embodiments the user device 108 may not include speakers 1002. For example, the user device 108 may comprise a microphone device into which a user speaks to issue commands or may comprise a device for connection to another appliance such as a television. Instead of integrated speakers 1002, embodiments such as this may use loudspeaker capabilities of other devices, including other user devices that do have loudspeakers and different types of dedicated loudspeaker components. As one example, the user device 108 may produce an audio output signal that drives an external loudspeaker. As another example, the user device 108 may drive or control an external loudspeaker through a wireless data connection such as a Bluetooth connection. In other situations, the user device 108 may be used in conjunction with a loudspeaker device that receives audio signals and other instructions from the remote system 120, rather than from the user device 108.

The microphones 1004 may include sensors (e.g., transducers) configured to receive sound. The microphones 1004 may generate input signals for audio input (e.g., sound). For example, the microphones 1004 may determine digital input signals for an utterance of a user. In some instances, the microphones 1004 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 1004 may be in a planar configuration, or positioned apart in a non-planar three-dimensional region. In some implementations, the microphones 1004 may include a spatially disparate array of sensors in data communication. For example, a networked array of sensors may be included. The microphones 1004 may include omni-directional microphones, directional microphones (e.g., shotgun microphones), and so on.

In some examples, the microphones 1004 and the speakers 1002 facilitate interactions, such as dialogue, with user 102. The microphones 1004 produce audio signals representing sound from the environment of the user device 108, such as voice commands 106 by the user 102. The audio signals produced by the microphones 1004 may comprise directional audio signals or may be used to produce directional audio signals, where each of the directional audio signals emphasizes audio from a different radial direction relative to the microphones 1004.

The processors 1000 of the user device 108 may be coupled to the components of the user device 108 to cause the user device 108 to perform various actions or operations. In some examples, the user device 108 may include one or more proximity detection devices 1006, such as a camera, a ranging device, or other sensor that is used to determine the portion of the user 102 relative to the user device 108, and generate corresponding proximity or distance data. This proximity or distance data may be used as metadata for purposes of transitioning a call between devices 108.

The user device 108 may also include imaging devices 1008 which take images of the environment 102 of the user 102. For instance, upon detecting a wakeword or other wake event, the user device 108 may collect image data using the imaging devices 1008. The imaging devices may include a camera, thermal imaging device, or any other type of imaging device 808 to capture images of the environment 102. The imaging devices 1008 may generate image data, which in turn may be used as metadata for purposes of transitioning a call between other user devices 108.

The user device 108 may include computer-readable media 1010. The computer-readable media 1010 may be used to store any number of software components that are executable by the processors 1000. Software components stored in the computer-readable media 1010 may include an operating system 1012 that is configured to manage hardware and services within and coupled to the user device 108. In addition, executable components stored by the computer-readable media 1010 may include audio processing components 1014 configured to produce an audio signal using the microphones 1004. The audio processing components 1014 may include functionality for processing microphone audio signals generated by the microphones 1004 and/or output audio signals provided to the speakers 1002. As an example, the audio processing components 1014 may include an acoustic echo cancellation or suppression component 816 for reducing acoustic echo generated by acoustic coupling between the microphones 1004 and the speaker 1002. The audio processing components 1014 may also include a noise reduction component 1018 for reducing noise in received audio signals, such as elements of microphone audio signals other than user speech.

The audio processing components 1014 may include one or more audio beamformers or beamforming components 1020 configured to generate directional audio signals that are focused in different directions. More specifically, the beamforming components 1020 may be responsive to audio signals from spatially separated microphone elements of the microphones 1004 to produce directional audio signals that emphasize sounds originating from different areas of the environment of the user device 108 or from different directions relative to the user device 108. The beamforming components 1020 may in some cases produce audio signal metric values that may be used in arbitration. For example, the beamforming components 1020 may indicate a signal strength of voice activity level corresponding to each directional audio signal.

Executable components stored in the computer-readable media 1010 and executed by the processors 800 may include a wake word detection component 1022 that monitors one or more of the directional audio signals to detect user utterances of the system of the trigger expression. As described above, wakeword detection may be implemented using keyword spotting technology, as an example.

The software components may also include a voice activity detection component 1024 configured to monitor levels of voice presence in the directional audio signals produced by the beamforming component 1020. Levels of voice presence may be used as am audio signal metric value for purposes of arbitration. In some examples, the voice activity may include an indication of the signal strength of the speech utterance 106 and an indication of ambient noise in the environment 102. For instance, the voice activity may be a ratio of the signal strength of the speech utterance 106 in an audio data 402 with the ambient noise in the audio data 402.

Software components of the user device 108 may also include a sound source localization (SSL) component 1024 that may be used to determine the distance of the user 102 from the user device 108. The SSL component 1024 is configured to analyze differences in arrival times of received sound at the respective microphones of the microphones 1004 in order to determine the position from which the received sound originated. For example, the SSL component 1024 may use time-difference-of-arrival (TDOA) techniques to determine the position or direction of a sound source. The determined position may be used as an audio signal metric value for purpose of performing arbitration as described herein.

The user device 108 also has various hardware components, not shown, such as communication components, power components, I/O components, signal processing components indicators, control buttons, amplifiers, etc. For instance, rather than receiving a "wake-word" to wake up, a user device 108 instead begin listening in response to a user 102 pressing a button on the device 108.

The user device 102 may have one or more network interfaces 1028 such as a wireless or Wi-Fi network communications interface, an Ethernet communications interface, a cellular network communications interface, a Bluetooth communications interface, etc., for communications with the speech processing system 120 over various types of networks 118, including wide-area network, local-area networks, private networks, public networks etc. In the case of a wireless communications interfaces, such interfaces may include radio transceivers and associated control circuits and logic for implementing appropriate communication protocols.

In some examples, the audio signal metric component 1026 may determine an audio signal metric value for each of a plurality of audio data 402 (e.g., beamformed audio signals) provided by the beamformer component 1020. In some embodiments, each audio signal metric value is determined based on the samples of one of a plurality of frames of a beamformed audio signal. For example, a signal-to-noise ratio may be determined for a plurality of frames for each of the plurality of beamformed audio signals.

The audio signal metric values f may be determined for each of the plurality of beamformed audio signals for each frame, resulting in an array of numbers in the form f(n)(k):
$$\{f(1)(k), f(2)(k), \ldots, f(N)(k)\}$$
Here, "k" is the time index and "n" is the audio stream index (or look direction index) corresponding to the nth beamformed audio signal.

An audio signal metric value may include a signal-to-noise ratio (SNR), a level of voice presence in the audio data 402, a spectral centroid measure (e.g., a peak spectral centroid measure), a speech energy level (e.g., a 4 Hz modulation energy), a spectral flux, a particular percentile frequency (e.g., a $90^{th}$ percentile frequency), a periodicity, a clarity, a harmonicity, and so on. A spectral centroid measure generally provides a measure for a centroid mass of a spectrum. A spectral flux generally provides a measure for a rate of spectral change. A particular percentile frequency generally provides a measure based on a minimum frequency bin that covers at least a particular percentage (e.g., 90%) of the total power. A periodicity generally provides a measure that may be used for pitch detection in noisy environments. Clarity generally provides a measure that has a high value for voiced segments and a low value for background noise. Harmonicity is another measure that generally provides a high value for voiced segments and a low value for background noise. A speech energy level (e.g., 4 Hz modulation energy) generally provides a measure that has a high value for speech due to a speaking rate. In other embodiments, any another audio signal metric value may be determined that is some function of raw beamformed signal data over a brief time window (e.g., typically not more than one frame). In some instances, an audio signal metric value may be determined based on samples of a plurality of frames of a beamformed audio signal.

In some instances, the audio signal metric component 1028 may determine an audio signal metric value with respect to a particular beamformed audio signal. As one example, an SNR value may be determined for a beamformed audio signal that is associated with a particular look direction. In other instances, an audio signal metric value may be determined for multiple beamformed audio signals. As one example, an average audio signal metric value may be determined for a plurality of beamformed audio signals that are determined for a user device, such as an average SNR value across any number of beamformed audio signals for the user device.

While various processing techniques and audio signal metric values are discussed herein, any other type of audio signal metric/characteristic value may be determined using the components of the user device 108. As used herein, a processor, such as processor(s) 124 and/or 1000, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 124 and/or 1000 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 124 and/or 1000 may possess its own local memory, which also may store program components, program data, and/or one or more operating systems.

As described herein, computer-readable media 128, 410, and/or 1010 may include volatile and nonvolatile memory, removable and non-removable media implemented in any method or technology for storage of information, such as computer-readable instructions, data structures, program component, or other data. Such computer-readable media 124, 410, and/or 1010 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 128 and/or 1000 to execute instructions stored on the computer-readable media 128, 410, and/or 1010. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 128, 410, and/or 1010, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 126, 408, and 1028 may enable communications between the user devices 108, the communications system 122, and the remote system 120, as well as other networked devices. Such network interface(s) can include one or more network interface controllers (NICs) or other types of transceiver devices to send and receive communications over a network.

For instance, each of the net network interface(s) 126, 408, and 1028 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 126, 408, and 1028 may include a wide area network (WAN) component to enable communication over a wide area network. The network 118 may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors;
   computer-readable media storing computer-executable instructions that, when executed by the one or more processors, cause the one or more processors to perform operations comprising:

determining that a first user device associated with a user is located in a same physical environment as a second user device associated with the user;

receiving an instruction to cause the first user device to perform a call with a contact associated with the user;

causing the first user device to communicate with a remote user device associated with the contact via a first network-based connection, wherein the first network-based connection is configured to communicate first audio call data between the first user device and the remote user device;

receiving, from the first user device, first audio data of the first audio call data, the first audio data representing speech of the user;

receiving, from the second user device, second audio data representing the speech of the user;

determining, based at least in part on a first audio-data characteristic corresponding to the speech represented in the first audio data, a first distance between the user and the first user device;

determining, based at least in part on a second audio-data characteristic corresponding to the speech represented in the second audio data, a second distance between the user and the second user device;

determining that the second distance is less than the first distance;

based at least in part on the second distance being less than the first distance, determining that a difference between the first distance and the second distance is greater than or equal to a threshold difference; and based at least in part on the difference between the first distance and the second distance being greater than the threshold difference, causing the second user device to communicate second audio call data with the remote user device via a second network-based connection.

2. The system of claim 1, the operations further comprising, prior to the receiving the request to perform the call with the contact associated with the user:

receiving, from the first user device, third audio data representing first sound captured by one or more microphones of the first user device;

receiving, from the second user device, fourth audio data representing second sound captured by one or more microphones of the second user device;

determining that the fourth audio data was received within a threshold period of when the third audio data was received;

based at least in part on the fourth audio data being received within the threshold period of when the third audio data was received, generating an association between the first user device and the second user device indicating that the first user device is located in the same physical environment as the second user device;

subsequent to receiving the request to perform the call with the contact, and based at least in part on the association:

causing the first network-based connection to be established using a Session Initiation Protocol (SIP); and causing the second network-based connection to be established using the SIP;

wherein:

the first audio call data communicated via the first network-based connection is communicated using a Real-time Transport Protocol (RTP); and the second audio call data communicated via the second network-based connection is communicated using the RTP.

3. The system of claim 1, wherein:

the first user device is associated with a display; and the first network-based connection is further configured to communicate video call data between the first user device and the remote user device; and the operations further comprising, subsequent to causing the second user device to communicate the second call audio data with the remote user device:

causing video call data from the remote user device to be sent to the first user device via the first network-based connection;

causing a portion of the second audio call data from the second user device to be sent to the remote user device; and causing a portion of the first audio call data from the remote user device to be sent to be sent to the second user device.

4. A method comprising:

causing, by one or more network-based devices, a first device to communicate first audio data with a remote user device via a first network-based connection, wherein the first device detects speech of a user in an environment of the first device and sends a first portion of the first audio data representing the speech to the remote user device via the first network-based connection and receives a second portion of the first audio data from the remote user device via the first network-based connection;

receiving, from a second device in the environment of the first device and at the one or more network-based devices, second audio data representing the speech of the user;

analyzing, by the one or more network-based devices, the first portion of the first audio data to identify a first audio-data characteristic corresponding to the speech;

analyzing, by the one or more network-based devices, the second audio data to identify a second audio-data characteristic corresponding to the speech represented in the second audio data; and based at least in part on the first audio-data characteristic and the second audio-data characteristic, causing, by the one or more network-based devices, third audio data from the second device to be sent to the remote user device via a second network-based connection.

5. The method of claim 4, further comprising, subsequent to causing the third audio data from the second device to be sent to the remote user device via the second network-based connection, causing fourth audio data from the remote user device to be sent to the first device.

6. The method of claim 4, wherein the first audio-data characteristic comprises at least one of:

a signal-to-noise ratio (SNR) value corresponding to the speech represented in the first portion of the first audio data;

an amplitude measurement of an audio signal corresponding to the speech represented in the first portion of the first audio data; or a measurement of signal energy in a frequency range corresponding to the speech represented in the first portion of the first audio data.

7. The method of claim 4, further comprising:

determining that the first device is associated with a display;

causing the first device to stop sending the first portion of the first audio data to the remote user device via the first network-based connection; and causing video data from the remote user device to be communicated to the first device via the first network-based connection.

8. The method of claim 7, further comprising, prior to causing third audio data from the second device to be sent to the remote user device via the second between based connection:

determining that the second audio-data characteristic is greater than the first audio-data characteristic by more than a threshold amount; and determining to cause the third audio data from the second device to be sent to the remote user device via the second network-based connection based at least in part on the second audio-data characteristic being greater than the first audio-data characteristic by more than the threshold amount.

9. The method of claim 4, wherein the first device receives the second portion of the first audio data from the remote user device and outputs the second portion of the first audio data at a first volume via a first speaker;

the method further comprising:

determining, based at least in part on the first audio-data characteristic and the second audio-data characteristic, that the user is closer to the second device;

causing the first device to decrease the first volume at which the second portion of the first audio data is output to a second volume over a first period of time; and causing the second device to increase a third volume at which a third portion of the third audio data is output by a second speaker to a fourth volume over a second period of time, wherein the first period of time at least partially overlaps with the second period of time.

10. The method of claim 4, further comprising:

determining that a threshold period of time has elapsed from a previous time at which fourth audio data was received, at the one or more network-based devices, from the second device; and based at least in part the threshold period of time having elapsed, causing the second device to activate a microphone to detect the speech of the user and generate the second audio data.

11. The method of claim 4, further comprising:

determining that the second audio-data characteristic corresponding to the speech represented in the second audio data is greater than or equal to a threshold value;

based at least in part on the second audio-data characteristic being greater than or equal to the threshold value, determining that the second audio-data characteristic is greater than the first audio-data characteristic by more than a threshold amount; and wherein the causing the third audio data from the second device to be sent to the remote user device via the second network-based connection is performed at least partly based on the second audio-data characteristic being greater than the first audio-data characteristic by more than the threshold amount.

12. A system comprising:

one or more processors;

computer-readable media storing computer-executable instructions that, when executed by the one or more processors, cause the one or more processors to perform operations comprising:

causing a first device to communicate with a remote user device via one or more first network-based connections, wherein the first device sends first audio call data representing first speech of a user to the remote user device and receives second audio call data from the remote user device via the one or more first network-based connections;

receiving data from at least two of the first device, a second device in an environment of the first device, or a third device in the environment;

determining, based at least in part on the data, that the user is closer to the second device than the first device; and based at least in part on the user being closer to the second device than the first device, causing the second device to communicate with the remote user device via one or more second network-based connections, wherein the second device sends third audio call data representing second speech of the user to the remote user device.

13. The system of claim 12, wherein:

the receiving the data from the at least two of the first device, the second device, or the third device, comprises:

receiving, from the first device, first proximity data indicating a first distance between the user and the first device, the first proximity data being generated using a first proximity sensor of the first device; and receiving, from the second device, second proximity data indicating a second distance between the user and the second device, the second proximity data being generated using a second proximity sensor of the second device; and the determining that the user is closer to the second device than the first device comprises determining that the second distance is less than the first distance.

14. The system of claim 12, wherein:

at least one of the first device, the second device, or the third device includes an imaging device;

the receiving the data from the at least two of the first device, the second device, or the third device, comprises receiving image data generated by the imaging device of the at least one of the first device, the second device, or the third device; and determining that the user is closer to the second device than the first device is based at least in part on analyzing the image data.

15. The system of claim 12, wherein:

the receiving the data from the at least two of the first device, the second device, or the third device, comprises:

receiving, from the first device, the first audio call data representing a portion of the first speech of the user; and receiving, from the second device, audio data representing the portion of the first speech of the user;

the operations further comprising:

analyzing, by the one or more network-based devices, the first audio call data to identify a first audio-data characteristic corresponding to the first speech; and analyzing, by the one or more network-based devices, the audio data to identify a second audio-data characteristic corresponding to the first speech represented in the audio data;

wherein the determining that the user is closer to the second device than the first device is based at least in part on the first audio-data characteristic and the second audio-data characteristic.

16. The system of claim 15, wherein the audio data comprises first audio data, the operations further comprising:
    determining that a threshold period of time has elapsed from a previous time at which second audio data was received from the second device; and
    based at least in part the threshold period of time having elapsed, causing the second device to activate a microphone to detect the first speech of the user and generate the first audio data.

17. The system of claim 12, wherein:
    the first device further receives, from the remote user device, first video data via the one or more first network-based connections;
    the operations further comprising:
        stopping the first audio call data from the first device from being sent to the remote user device via the one or more first network-based connections;
        stopping the first video data from the remote user device from being sent to the first device via the one or more first network-based connections; and
        causing second video data from the remote user device to be sent to the second device via the one or more second network-based connections.

18. The system of claim 12, the operations further comprising:
    receiving input data from at least one of the first device or the second device, the input data indicating a request to perform a call with a contact associated with the remote user device;
    determining that the second device is in the environment of the first device;
    based at least in part on the second device being in the environment of the first device:
        causing the one or more first network-based connections to be established using a Session Initiation Protocol (SIP); and
        causing the one or more second network-based connections to be established using the SIP.

19. The system of claim 12, wherein:
    the first device is associated with a display; and
    the one or more first network-based connections are further configured to communicate video call data between the first device and the remote user device; and
    the operations further comprising, subsequent to causing the second device to communicate with the remote user device via the one or more second network-based connections:
        causing video call data from the remote user device to be sent to the first device; and
        causing fourth audio call data from the remote user device to be sent to the second device.

20. The system of claim 12, the operations further comprising,
    subsequent to causing the second device to send the third audio call data representing the second speech to the remote user device via the one or more second network-based connections:
    stopping the first audio call data from the first device from being sent to the remote user device; and
    causing fourth audio call data from the remote user device to be sent to the first device.

* * * * *